United States Patent
Alberth et al.

(10) Patent No.: US 11,722,593 B2
(45) Date of Patent: *Aug. 8, 2023

(54) SYSTEMS AND METHODS FOR DETERMINING A HEIGHT OF A MOBILE DEVICE ABOVE A SURFACE

(71) Applicant: NextNav, LLC, Sunnyvale, CA (US)

(72) Inventors: William Alberth, Prairie Grove, IL (US); Michael Dormody, San Jose, CA (US)

(73) Assignee: NextNav, LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/457,340

(22) Filed: Dec. 2, 2021

(65) Prior Publication Data

US 2022/0103677 A1 Mar. 31, 2022

Related U.S. Application Data

(63) Continuation of application No. 16/944,309, filed on Jul. 31, 2020, now Pat. No. 11,196,855, which is a (Continued)

(51) Int. Cl.
*H04M 1/725* (2021.01)
*H04W 4/029* (2018.01)
(Continued)

(52) U.S. Cl.
CPC ....... *H04M 1/72454* (2021.01); *H04W 4/029* (2018.02); *H04W 4/16* (2013.01); *H04M 2250/02* (2013.01); *H04M 2250/12* (2013.01)

(58) Field of Classification Search
CPC ......... H04M 1/72569; H04M 2250/02; H04M 2250/12; H04W 4/029; H04W 4/16
(Continued)

(56) References Cited

U.S. PATENT DOCUMENTS 9,967,701 B1 * 5/2018 Barfield, Jr. ............ G01C 21/20
10,129,701 B2 * 11/2018 Li ........................... H04W 4/80
(Continued)

FOREIGN PATENT DOCUMENTS

CN    104094083 A    10/2014
CN    111902731 A    11/2020
(Continued)

OTHER PUBLICATIONS

Office Action dated Sep. 5, 2022 for China Patent Application No. 201980088798.0.
(Continued)

*Primary Examiner* — Nathan S Taylor
(74) *Attorney, Agent, or Firm* — MLO, a professional corp.

(57) ABSTRACT

Determining one or more heights of one or more mobile devices above surfaces. Particular embodiments described herein include machines that retrieve first data (e.g., measurement value(s) determined by sensor(s) of a mobile device or estimated position(s) of the mobile device), determine a location context based on the first data, identify second data (e.g., measurement value(s) determined by sensor(s) of the mobile device or status indicator value(s) of feature(s) of the mobile device) to retrieve for use in determining an estimated height above a surface at which the mobile device is located based on the determined location context, retrieve the second data, and determine an estimated height above a surface at which the mobile device is located based on the retrieved second data.

18 Claims, 12 Drawing Sheets

Related U.S. Application Data continuation of application No. 16/721,184, filed on Dec. 19, 2019, now Pat. No. 10,805,452.

(60) Provisional application No. 62/791,849, filed on Jan. 13, 2019.

(51) Int. Cl.
*H04W 4/16* (2009.01)
*H04M 1/72454* (2021.01)

(58) Field of Classification Search
USPC .......................................................... 455/418
See application file for complete search history.

(56) References Cited

U.S. PATENT DOCUMENTS

| | | | | |
|---|---|---|---|---|
| 10,274,509 | B1* | 4/2019 | Challoner | G01C 25/005 |
| 2006/0100782 | A1* | 5/2006 | Levi | G01C 5/06 |
| | | | | 701/468 |
| 2009/0088180 | A1* | 4/2009 | LaMance | G01S 5/14 |
| | | | | 455/456.1 |
| 2012/0290253 | A1* | 11/2012 | Barrett | G01C 5/06 |
| | | | | 702/150 |
| 2014/0135040 | A1* | 5/2014 | Edge | G01C 5/06 |
| | | | | 455/456.6 |
| 2014/0172351 | A1* | 6/2014 | Barfield | G01C 5/06 |
| | | | | 702/138 |
| 2014/0188431 | A1* | 7/2014 | Barfield | G01C 5/06 |
| | | | | 702/160 |
| 2014/0323149 | A1* | 10/2014 | Skomra | H04W 64/00 |
| | | | | 455/456.1 |
| 2014/0329539 | A1* | 11/2014 | Li | G01S 5/0284 |
| | | | | 455/456.1 |
| 2015/0201305 | A1* | 7/2015 | Edge | H04W 4/021 |
| | | | | 455/456.3 |
| 2015/0247917 | A1* | 9/2015 | Gum | H04W 4/029 |
| | | | | 342/462 |
| 2015/0319578 | A1* | 11/2015 | Edge | H04W 4/025 |
| | | | | 455/456.6 |
| 2016/0091606 | A1* | 3/2016 | Shin | G01S 15/08 |
| | | | | 367/99 |
| 2016/0138993 | A1* | 5/2016 | Van De Meulenhof | G01L 27/002 |
| | | | | 702/104 |
| 2016/0231192 | A1* | 8/2016 | Hammerschmidt | G01L 9/0072 |
| 2016/0245716 | A1* | 8/2016 | Gum | G01L 27/002 |
| 2017/0078849 | A1* | 3/2017 | Li | G01S 5/0263 |
| 2017/0280310 | A1* | 9/2017 | Jain | H04W 4/90 |
| 2017/0332192 | A1* | 11/2017 | Edge | H04W 4/02 |
| 2017/0359694 | A1* | 12/2017 | Jensen | G01S 19/34 |
| 2019/0052704 | A1* | 2/2019 | Zavesky | H04W 4/02 |
| 2019/0088098 | A1* | 3/2019 | Gangumalla | G01L 27/005 |
| 2019/0340906 | A1* | 11/2019 | Williams | G08B 21/0277 |
| 2019/0349853 | A1* | 11/2019 | Singh | G01S 5/019 |
| 2019/0360804 | A1* | 11/2019 | Dormody | G01S 19/23 |
| 2019/0365255 | A1* | 12/2019 | Kitagawa | A61B 5/02108 |
| 2020/0045668 | A1* | 2/2020 | Dormody | H04W 4/33 |
| 2020/0051189 | A1* | 2/2020 | Williams | H04L 67/535 |
| 2021/0084451 | A1* | 3/2021 | Williams | H04W 4/38 |
| 2021/0156685 | A1* | 5/2021 | Nagarajan | G01C 5/06 |

FOREIGN PATENT DOCUMENTS

| | | |
|---|---|---|
| JP | 2012242302 A | 12/2012 |
| WO | 2012161086 A1 | 11/2012 |
| WO | WO-2019068606 A1 * 4/2019 ............. F03D 17/00 |

OTHER PUBLICATIONS

Form PCT/ISA/206, PCT/US2019/067541, "Invitation to Pay Additional Fees and, Where Applicable, Protest Fee", 4page(s);EPO Form P04A42, PCT/ US2019/067541, "Information on Search Strategy", 1 page(s);EPO Form 1707, PCT/ US2019/067541, "Provisional Opinion", 8 page(s);dated Jul. 10, 2020.
Form PCT/ISA/210, PCT/US2019/067541, "International Search Report", 5 page(s);EPO Form P04A42, PCT/US2019/067541, "Information on Search Strategy", 1 page(s);Form PCT/ISA/237, PCT/US2019/067541, "Written Opinion of the International Searching Authority", 14 page(s), dated Aug. 31, 2020.
Notice of Allowance and Fees dated Aug. 10, 2021 for U.S. Appl. No. 16/944,309.
Office Action dated Feb. 9, 2023 for India Patent Application No. 202117032237.

\* cited by examiner

SYSTEMS AND METHODS FOR DETERMINING A HEIGHT OF A MOBILE DEVICE ABOVE A SURFACE

CROSS-REFERENCE TO RELATED APPLICATIONS

This application is a continuation of U.S. patent application Ser. No. 16/944,309, filed Jul. 31, 2020, which is a continuation of U.S. patent application Ser. No. 16/721,184, filed Dec. 19, 2019, now U.S. Pat. No. 10,805,452, which claims priority to U.S. Provisional Patent Application No. 62/791,849, filed Jan. 13, 2019, all of which are hereby incorporated by reference herein in their entirety.

BACKGROUND

Knowing the height above a surface (e.g., a ground-level surface outside or a floor-level surface of a structure) at which a mobile device is located has many valuable uses. For instance, heights above a surface can be used to calibrate a pressure sensor of a mobile device, estimate an altitude of the mobile device relative to a known altitude of the surface, or estimate an altitude of the surface (e.g., a floor in a building). Past approaches typically assume that the mobile device is located at a common expected height above the surface, such as approximately 0.9 meters or 3 feet, which corresponds to heights of things on which or in which the mobile device is likely to be placed (e.g., furniture, pockets or bags). In some cases, a common expected height above a surface can differ from the true height of a mobile device above the surface by over 1 meter (e.g., when the mobile device is not in a user's pocket, and is instead being held against the user's ear during a phone call). Thus, use of a common expected height is unreliable, and different uses of the common expected height will lead to erroneous results that may be unacceptable or possible to improve. It follows that more-accurate estimates of the height above a surface at which a mobile device is located would be advantageous for use in improving the usefulness of the height. Systems and methods for determining an improved height estimate of a mobile device are described herein.

DETAILED DESCRIPTION

Figure 1:
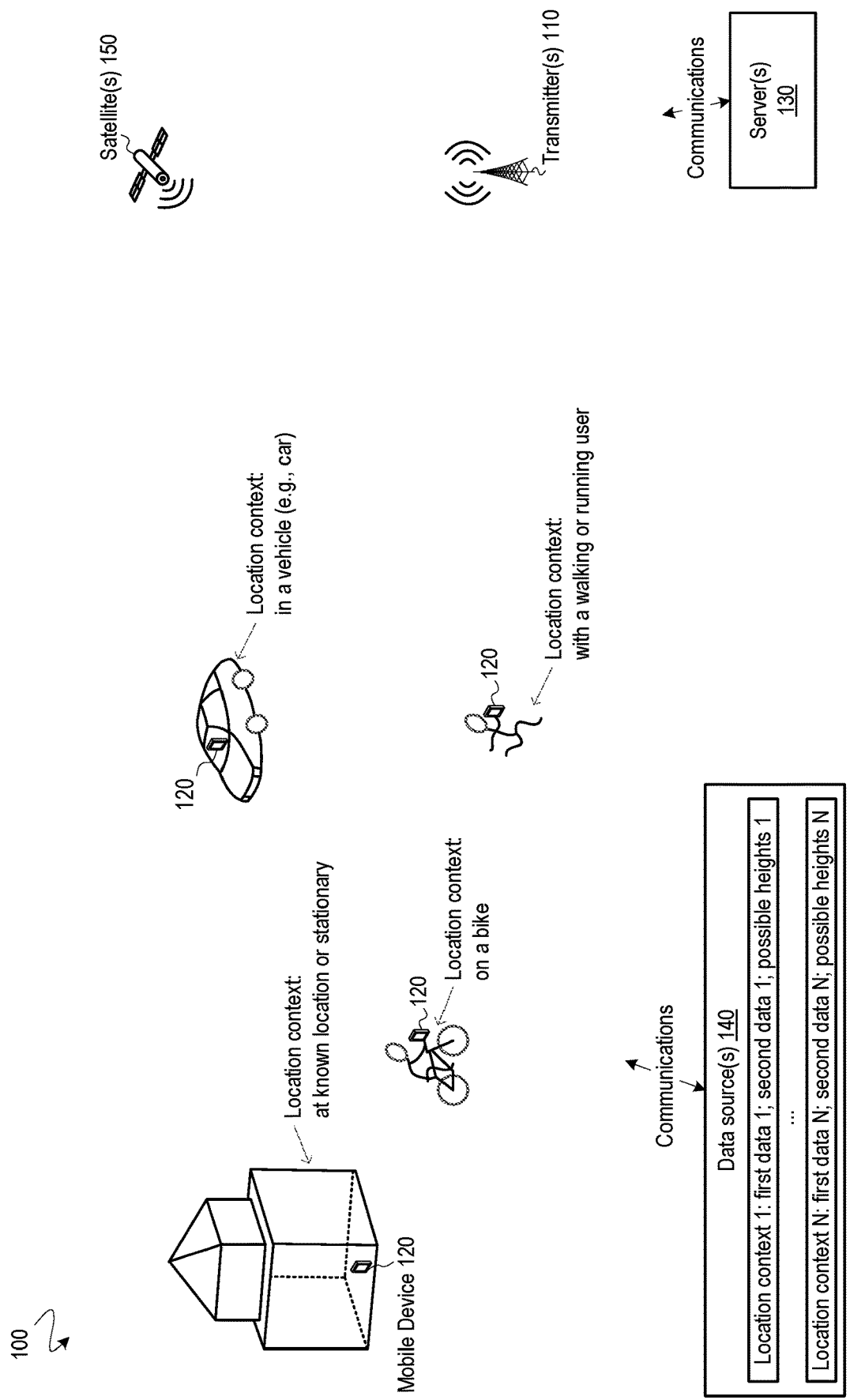
FIG. 1 depicts an environment in which systems and methods for determining a height of a mobile device above a surface may operate.
Figure 4:
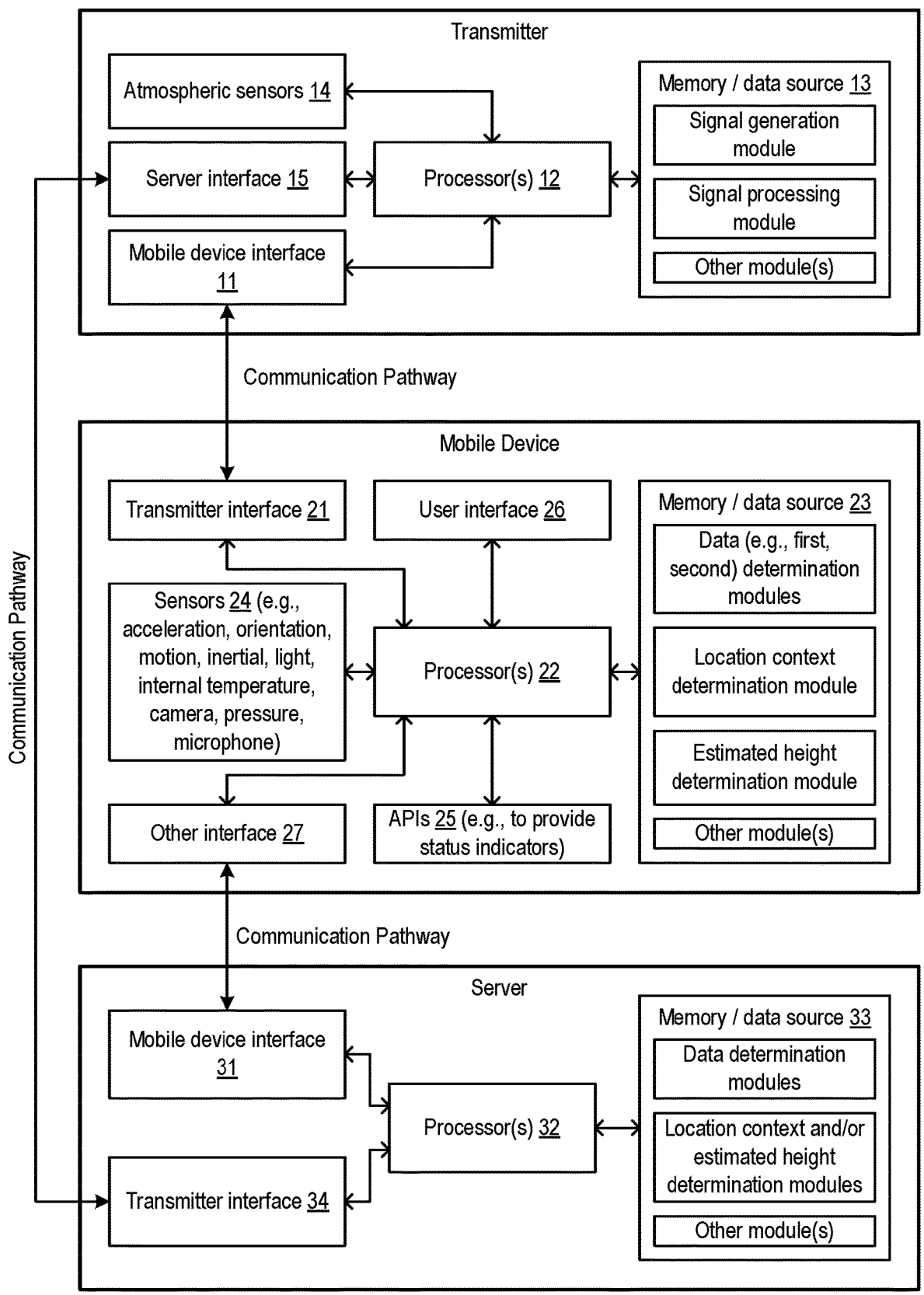
FIG. 4 illustrates components of a transmitter, a mobile device, and a server of the environment in which systems and methods for determining a height of a mobile device above a surface may operate.

Systems and methods for determining a height of a mobile device above a surface are described herein. For purposes of illustration, FIG. 1 depicts an environment 100 that includes a positioning system (e.g., a network of terrestrial transmitters 110 and/or a network of satellites 150) configured to transmit positioning signals used to estimate positions of mobile devices 120, as is well-known in the art. The estimated positions may be determined at the mobile devices 120 or a server 130. By way of example, the mobile devices 120 may be a mobile phone or other wireless communication device, a portable computer, a navigation device, a tracking device, a receiver, or another suitable device. Examples of possible components in the transmitters 110, the mobile devices 120 and the server 130 are shown in FIG. 4 and discussed in the 'Other Aspects' section near the end of this disclosure or elsewhere herein. Pressure and temperature sensors (not shown) may be co-located with any of the transmitters 110, and can generate measurements of pressure and temperature that are used to estimate an unknown altitude $h_{mobile}$ of a particular mobile device using the following well-known barometric formula:

$$h_{mobile} = h_{sensor} - (RT/gM)\ln(P_{sensor}/P_{mobile}) \quad \text{(Equation 1)},$$

where $P_{mobile}$ is an estimate of pressure from a pressure sensor of the mobile device, $P_{sensor}$ is an estimate of pressure and T is an estimate of temperature from the location of a transmitter, $h_{sensor}$ is an estimated altitude of the transmitter, g corresponds to acceleration due to gravity (e.g., $-9.8 \text{ m/s}^2$), R is a gas constant, and M is molar mass of air. Estimates of altitude often have some level of error due to drift of the pressure sensor of the mobile device, which requires accurate calibration of the pressure sensor over time. Aspects of this disclosure relate to determining a height above a surface at which a mobile device resides, which can be used to calibrate the pressure sensor of that mobile device, among other uses.

As described herein, different "location contexts" of mobile phones can be determined, and the determined location contexts can be used to estimate heights above a surface (e.g., the ground, a floor or another type of surface) at which the mobile devices are located. Resultant estimated heights have many uses that are discussed later herein, including use in calibrating pressure sensors of mobile devices, use in estimating altitudes of mobile devices, or use in estimating altitudes of the surfaces. By way of example, location contexts may include: a particular mobile device is at a known location; a particular mobile device is stationary; a particular mobile device is on a bike; a particular mobile device is with a user who is walking or running; a particular mobile device is in a vehicle; or other location contexts described herein. For purposes illustration, FIG. 1 depicts some of the foregoing location contexts. As discussed later herein, a particular location context for a particular mobile device can be determined using first data, after which the determined location context is used along with second data to determine an estimated height above a surface at which the mobile device is located. Details regarding first data and second data are provided later.

Different approaches for estimating the height above a surface at which a mobile device is located are described herein, including (i) an approach that uses first data to identify a location context that is in turn used to identify second data that is in turn used to determine an estimated height, and (ii) an approach that uses first data to identify a location context that is in turn used to identify possible estimated heights that are in turn used to identify second data that is in turn used to select an estimated height from among the possible estimated heights. As shown in FIG. 1, one or more data sources 140 can be used to store different location contexts. For each location context, the data sources 140 may store first data that is used to identify that location context from among other location contexts, and may also store particular second data and/or particular possible heights in association with a particular location context. In some embodiments, particular possible heights are stored only in association with particular second data that is stored in association with particular location contexts.

Figure 2A:
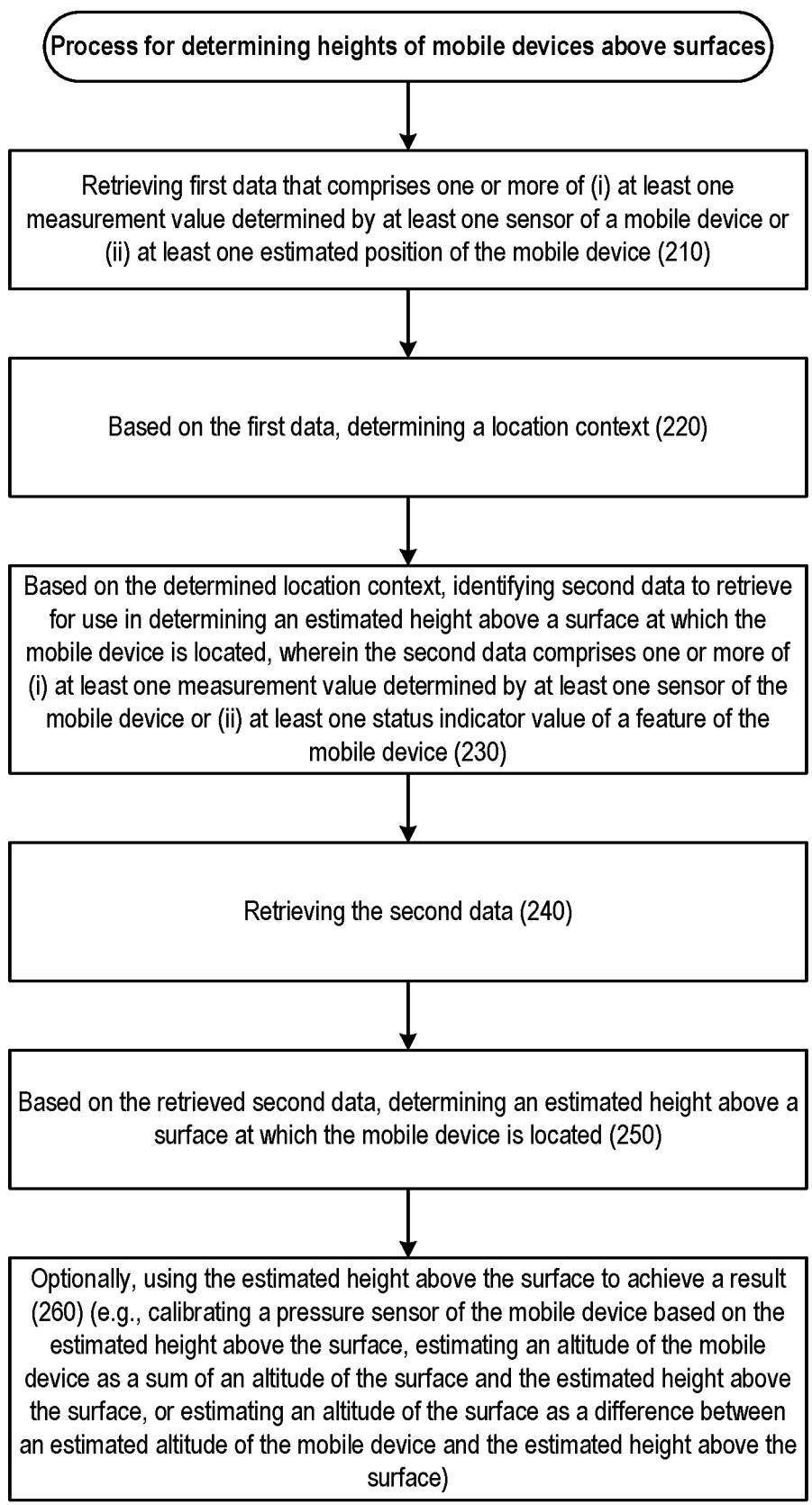
FIG. 2A depicts a first process for determining a height of a mobile device above a surface.

A first process for determining heights of mobile devices above surfaces is shown in FIG. 2A, which includes the following steps: retrieving first data that comprises one or more of (i) at least one measurement value determined by at least one sensor of a mobile device or (ii) at least one estimated position of the mobile device (210); based on the first data, determining a location context (220); based on the determined location context, identifying second data to retrieve for use in determining an estimated height above a surface at which the mobile device is located, wherein the second data comprises one or more of (i) at least one measurement value determined by at least one sensor of the mobile device or (ii) at least one status indicator value of a feature of the mobile device (230); retrieving the second data (240); determining, based on the retrieved second data, an estimated height above a surface at which the mobile device is located (250); and (optionally) using the estimated height above the surface to achieve a result (260). Embodiments for each of these steps are discussed below.

Initially, first data is retrieved (210). In different embodiments of step 210, the first data comprises (i) at least one measurement value determined by at least one sensor of the mobile device, (ii) at least one estimated position of the mobile device, or both (i) and (ii). By way of example, retrieval of data during step 210 may include receiving the data from a source of the data (e.g., a sensor, memory, or other data source), and optionally includes requesting the data from the source of the data. Requests can be in any known form.

A location context is determined based on the first data (220). Location contexts specify location circumstances of the mobile device that can be used to determine a height of the mobile device above a surface. In one embodiment of step 220, the determined location context specifies the mobile device is at a known location (e.g., a residence or workplace of the mobile phone's user, or another type of area or place). In other embodiments of step 220, the location context specifies estimated location circumstances of the mobile device as being any of: (i) with a user who is on foot; (ii) on a bike or with a user who is on a bike; (iii) in a vehicle such as a car or public transportation; (iv) stationary; or (v) on the surface after being dropped. In these other embodiments, the location context may be selected from a group of possible location contexts that include different combinations of the estimated location circumstances (i) through (v), which permits customized implementations—e.g., a first embodiment comprising a group of one possible location context, a second embodiment comprising a group of two possible location contexts, a third embodiment comprising a group of three possible location contexts, a fourth embodiment comprising a group of four possible location contexts, and a fifth embodiment comprising a group of five possible location contexts. Examples of determining different location contexts based on different values of the first data are provided below under section heading 'Determining a location context based on retrieved first data'.

Based on the determined location context, second data to retrieve is identified for use in determining an estimated height above a surface at which the mobile device is located (230). In different embodiments of step 230, the second data comprises (i) at least one measurement value determined by at least one sensor of the mobile device, (ii) at least one status indicator value of a feature of the mobile device, or both (i) and (ii). Examples of different second data are provided later under the "Second data" heading. In a first embodiment of step 230, one or more types of data associated with the determined location context are identified as the second data to retrieve. By way of example, the determined location context may be used in a search query of a data source that stores different data types that each have association(s) to location context(s), and the determined location context is used to look up, as the second data to retrieve, the data types associated with that location context. The stored data types could be identifiers specifying particular types of data to retrieve—e.g., a measurement from a sensor of the mobile device, or values any of one or more status indicators from an API of the mobile device. In a second embodiment of step 230, one or more values of data associated with the determined location context are identified as the second data to retrieve. By way of example, the determined location context may be used in a search query of a data source that stores different data values that are each associated to any number of location context(s), and the determined location context is used to look up, as the second data to retrieve, all values of data associated with that location context. For example, the stored data values could be a value of a measurement determined by a sensor of the mobile device, or values of one or more status indicators from an API of the mobile device. By way of example, FIG. 1 illustrates a data source 140 that stores different sets of data types or data values (e.g., second data 1 through second data N), where each set of data types or data values is associated with one or more location contexts (e.g., location context 1 through location context N). In some implementations of the first and second embodiments of step 230, additional data types or data values associated with other location contexts other than the determined location context can also be identified for retrieval regardless of the determined location context, or such additional data types or data values can be excluded from retrieval. Also, previously retrieved values of data that were retrieved in association with a previous location context that was determined at an earlier time can be cached for later retrieval in case the currently determined location context is identical to the previous location context and new values of that data are unavailable.

The second data is retrieved (240). By way of example, retrieval of data values during step 240 may include receiving the data from a source of the data (e.g., a sensor, memory, the data source, or any other suitable source of the data values), and optionally includes requesting the data from the source of the data. Requests can be in any known form.

An estimated height above the surface at which the mobile device is located is determined based on the retrieved second data (250). Examples of determining different estimated heights based on different location contexts and associated second data are provided in FIG. 3A through FIG. 3H, which are discussed later.

Optionally, the estimated height above the surface is used to achieve a result (260). In a first embodiment of optional step 260, the estimated height above the surface is used to calibrate a pressure sensor of the mobile device based on a difference between an estimated altitude of the mobile device and the sum of a known altitude of the surface and the estimated height that was determined during step 250. By way of example, the estimated altitude of the mobile device may be determined using any known means (e.g., a satellite or terrestrial positioning system, a barometric positioning system, or other system), and the description under the "Calibration" heading of this disclosure illustrates how a pressure sensor of the mobile can be calibrated using the estimated height above the surface. In a second embodiment of optional step 260, the estimated height above the surface is used to determine an estimated altitude of the mobile device as the sum of a known altitude of the surface and the estimated height that was determined during step 250. By way of example, the known altitude of the surface may be accessed from a data source, such as a building or terrain database that stores the known altitude in association with a position that matches an initial estimate of the mobile device's position, or a local beacon that is communicating with the mobile device (e.g., a WiFi beacon), a floor number or a venue identified by a user of the mobile device, or other information. In a third embodiment of optional step 260, the estimated height above the surface is used to estimate an altitude of the surface as the difference between an estimated altitude of the mobile device and the estimated height that was determined during step 250. By way of example, the estimated altitude of the mobile device may be determined using any known means (e.g., a satellite or terrestrial positioning system, a barometric positioning system, or other system).

Figure 2B:
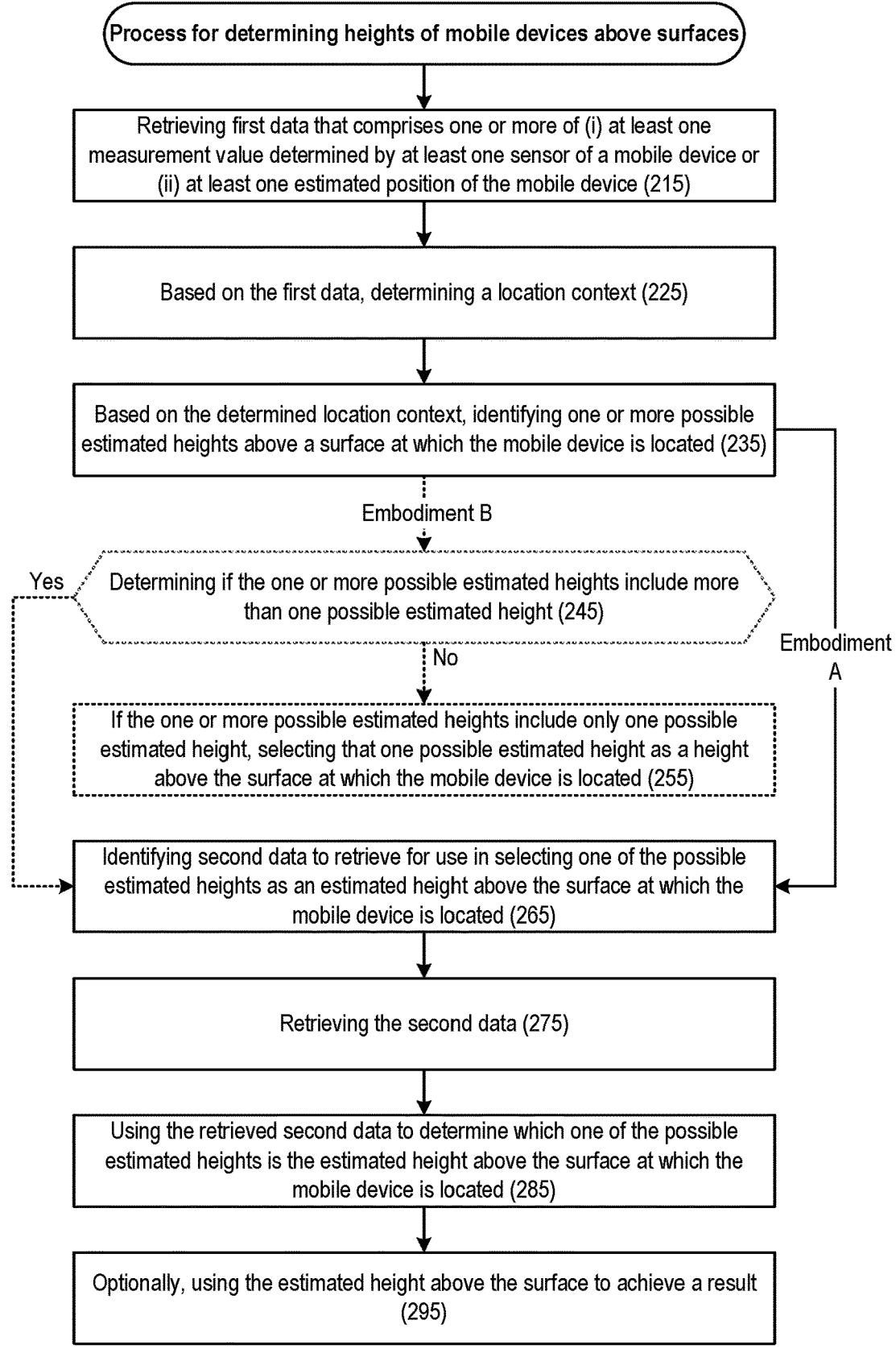
FIG. 2B depicts a second process for determining a height of a mobile device above a surface.

A second process for determining heights of mobile devices above surfaces is shown in FIG. 2B, which includes the following steps: retrieving first data that comprises one or more of (i) at least one measurement value determined by at least one sensor of a mobile device or (ii) at least one estimated position of the mobile device (215); based on the first data, determining a location context (225); based on the determined location context, identifying one or more possible estimated heights above a surface at which the mobile device is located (235); (optionally) determining if the one or more possible estimated heights include more than one possible estimated height (245); (optionally) if the one or more possible estimated heights include only one possible estimated height, selecting that one possible estimated height as a height above the surface at which the mobile device is located (255); identifying second data to retrieve for use in selecting one of the possible estimated heights as an estimated height above the surface at which the mobile device is located (265); retrieving the second data (275); and using the retrieved second data to determine which one of the possible estimated heights is the estimated height above the surface at which the mobile device is located (285); and (optionally) using the estimated height above the surface to achieve a result (295). Each of these steps are discussed below. Each of these steps are discussed below.

First data is retrieved (215) and a location context is determined based on the first data (225). Details for steps 215 and 225 are the same details for steps 210 and 220 of FIG. 2A.

Based on the determined location context, one or more possible estimated heights above a surface at which the mobile device is located are identified (235). By way of example, the one or more possible heights may be stored by a data source in association with the determined location context, and the determined location context may be used in a search query of to that data source such that the determined location context is used to look up the one or more possible estimated heights.

Optionally, a determination is made as to whether the one or more possible estimated heights include more than one possible estimated height (245), which may be a simple query of the number of possible heights and a determination as to whether the number of possible heights exceeds one possible height, and if the one or more possible estimated heights include only one possible estimated height, then that one possible estimated height is selected as a height above the surface at which the mobile device is located (255).

Second data to retrieve is identified for use in selecting one of the possible estimated heights as the height above the surface at which the mobile device is located (265). By way of example, each of the one or more possible estimated heights may be stored by a data source in association with a respective set of second data, and the identified possible estimated heights may be used in a search query to that data source such that the possible estimated heights are used to look up the second data associated with those possible estimated heights. Alternatively, the determined location context could look up both the possible estimated heights and the second data associated with the possible estimated heights. Details for step 265 are the same details for step 230 of FIG. 2A.

The identified second data is subsequently retrieved (275). Details for step 275 are the same details for step 240 of FIG. 2A.

Based on the retrieved second data, one of the possible estimated heights is selected as the estimated height above the surface at which the mobile device is located (285). Examples of determining different estimated heights based on different second data are provided in FIG. 3A through FIG. 3H, which are discussed later. The determined estimated height is the selected height.

Optionally, the estimated height above the surface is used to achieve a result (295). Details for step 295 are the same details for step 260 of FIG. 2A.

The sections that follow describe different embodiments of FIG. 2A and FIG. 2B, including (i) different approaches for determining a location context based on retrieved first data, (ii) examples of second data, and (iii) different approaches for estimating a height above a surface at which a mobile device is located are discussed. Before advancing to these sections, attention is given to examples of mobile device features that may be implicated by the different embodiments described below. By way of example, such features of a mobile device (e.g., any the mobile devices 120 of FIG. 1) are provided in FIG. 4, which shows that the mobile device may include: a transmitter interface 21 for exchanging information with a transmitter (e.g., an antenna and RF front end components known or otherwise disclosed herein); one or more processor(s) 22; memory/data source 23 for providing storage and retrieval of data and for providing storage and retrieval of instructions from modules relating to methods of operation described herein or other processing that may be executed by the processor(s) 22 or other component(s); a user interface 26 (e.g., display, keyboard, microphone, speaker, other) for permitting a user to provide inputs and receive outputs; another interface 27 for exchanging information with a server or other devices external to the mobile device (e.g., an antenna, a network interface, or other known wired or wireless links); a GNSS interface and GNSS processing unit (not shown); and any other components of typical mobile devices known to one of ordinary skill in the art. The mobile device may include different sensor(s) 24—e.g., an accelerometer for measuring acceleration of the mobile device, a gyroscope for measuring orientation of the mobile device, any other inertial measurement unit (IMU) for measuring aspects of the mobile device's movement, a pressure sensor for measuring a pressure at the altitude of the mobile device, a temperature sensor for measuring an internal temperature of the mobile device, a light sensor for measuring ambient light, a microphone for measuring sound, a camera for capturing images, or other known sensors. As will be discussed below, these sensors are used to generate data (e.g., the first data and/or the second data). The mobile device may also include one or more application programming interfaces (APIs) 25 that provide different status indicators described later under the 'Second Data' section.

As shown in FIG. 4, the memory/data source 23 may include memory that stores software modules with executable instructions, and the processor(s) 22 may perform different actions by executing the instructions from the modules, including: (i) performance of part or all of the methods as described herein or otherwise understood by one of skill in the art as being performable at the mobile device (e.g., determining a location context, estimating a height, using the estimated height, retrieving first data and/or retrieving second data); (ii) estimation of an altitude of the mobile device; (iii) GNSS or terrestrial signal processing of received signals to determine position information (e.g., times of arrival or travel time of received signals, pseudoranges between the mobile device and transmitters, atmospheric information from transmitters, and/or location or other information associated with each transmitter); (iv) use of the position information to compute an estimated position of the mobile device; (v) determination of movement based on measurements from inertial sensors of the mobile device; or (vi) other processing as required by operations described in this disclosure.

Determining a Location Context Based on Retrieved First Data

In one embodiment of step 220 of FIG. 2A or step 225 of FIG. 2B, location contexts specify an estimated location circumstance of the mobile device as being any of: (i) with a user who is on foot; (ii) on or with a user who is on a bike; (iii) in a vehicle; (iv) stationary; or (v) on the ground or floor after being dropped. Any combination of the estimated location circumstances of the mobile device (e.g., with a user who is on foot; on or with a user who is on a bike; in a vehicle; stationary; or on the ground or floor after being dropped) can be considered as a possible location context in different implementations—e.g., only one of the estimated location circumstances is considered in a first implementation (e.g., determining if the location context is stationary), only two of the estimated location circumstances are considered in a second implementation (e.g., determining if the location context is with a user on foot, or in a vehicle), only three of the estimated location circumstances are considered in a third implementation, only four of the estimated locations are considered in a fourth implementation, or all five of the estimated locations are considered in a fifth implementation.

When the first data includes one or more measurement values determined by one or more inertial sensors of the mobile device (e.g., such as an inertial measurement unit (IMU), an individual accelerometer, and/or an individual gyroscope), determining the location context based on the first data uses any of different combinations of the conclusions described below with respect to first through fifth sets of embodiments.

In a first set of embodiments, the determined location context specifies an estimated location circumstance of the mobile device as being with a user who is on foot (e.g., walking or running) when the one or more measurement values are indicative of a movement associated with a walking or running user. In different embodiments, the one or more measurement values are indicative of a walking or running motion by the user when the measurement values represent a stepping movement of the user (e.g., a repetitive motion recorded over time that is associated with a walking or running motion, as is known in the art), or when the measurement values include periodic measurements of the same angular orientation (or periodic measurements of the same series of angular orientations) from a gyroscope that is indicative of an orientation (or orientations) at which a mobile device is periodically positioned while being carried by a user who is walking or running (e.g., when moving with the user's hand or pocket).

In a second set of embodiments, the determined location context specifies an estimated location circumstance of the mobile device as being on or with a user who is on a bike when the one or more measurement values are indicative of a movement associated with a moving bike. In one embodiment, the one or more measurement values are indicative of a movement associated with a moving bike when movement measured by an IMU of the mobile device includes vibrations as the bike is moving over on an unlevel bike path, such as particular vibrations that may be represented by sporadic, occasional or consistent up and down Z-accelerations of varying degrees of acceleration. By way of example, if a measured spread of the up and down Z-accelerations exceeds a threshold value for a percent of the time during which Z-accelerations are measured (e.g. 2 m/s^2 50% of the time), then the measured up and down Z-accelerations indicate the mobile device is on a bike. In another embodiment, the one or more measurement values are indicative of a movement associated with a moving bike when XY-directional movement measured by an accelerometer of the mobile device represents sporadic, occasional or consistent increases or decreases in acceleration of varying degrees as the bike increases and decreases its speeds while traveling. By way of example, if a measured spread of the increases and decreases of XY-accelerations exceeds a threshold value for a percent of the time during which XY-accelerations are measured (e.g. 5 m/s^2 75% of the time), then the measured increasing and decreasing XY-accelerations indicate the mobile device is on a bike.

In a third set of embodiments, the determined location context specifies an estimated location circumstance of the mobile device as being in a vehicle when the one or more measurement values are indicative of a movement associated with a moving vehicle (e.g., a car). In one embodiment, the one or more measurement values are indicative of a movement associated with a moving vehicle when movement measured by an IMU of the mobile device includes vibrations as the vehicle is moving over the ground, such as particular vibrations that may be represented by sporadic, occasional or consistent up and down Z-accelerations of varying degrees of acceleration. By way of example, if a measured spread of the up and down Z-accelerations exceeds a threshold value for a percent of the time during which Z-accelerations are measured (e.g. 3 m/s^2 50% of the time), then the measured up and down Z-accelerations indicate the mobile device is in a vehicle. In another embodiment, the one or more measurement values are indicative of a movement associated with a moving vehicle when XY-directional movement measured by an accelerometer of the mobile device represents sporadic, occasional or consistent increases or decreases in acceleration of varying degrees as the vehicle increases and decreases its speeds while in traveling. By way of example, if a measured spread of the increases and decreases of XY-accelerations exceeds a threshold value for a percent of the time during which XY-accelerations are measured (e.g. 10 m/s^2 50% of the time), then the measured increasing and decreasing XY-accelerations indicate the mobile device is in a vehicle.

In a fourth set of embodiments, the determined location context specifies an estimated location circumstance of the mobile device as being stationary when the one or more measurement values are indicative of no movement. By way of example, the one or more measurement values are indicative of no movement when a difference between two readings of an accelerometer that are measured within a predefined amount of time (e.g., 1 second, 10.0 seconds) of each other is below an acceleration threshold (e.g. 1 m/s^2, which accounts for possible measurement error). By way of another example, the one or more measurement values are indicative of no movement when an angular separation between two orientation readings of a gyroscope that are measured within a predefined amount of time (e.g., 1 second, 10.0 seconds) of each other is below an orientation threshold (e.g. less than 10 degrees of angular separation, which accounts for possible measurement error).

In a fifth set of embodiments, the determined location context specifies an estimated location circumstance of the mobile device as being on the surface after being dropped when the one or more measurement values are indicative of a movement associated with falling to and resting on a surface. By way of example, the one or more measurement values are indicative of a movement associated with falling to and resting on a surface when an accelerometer of the mobile device measures a large impact via a sudden change in Z-axis acceleration from one measurement to another measurement that exceeds a threshold amount of change (e.g. a first measurement of Z-axis acceleration was 9.8 m/s^2 due to gravity and the next Z-axis acceleration measurement was 100 m/s^2 which exceeds a threshold amount of change of 10 m/s^2), or an accelerometer of the mobile device measures no Z-axis acceleration after a measurement of Z-axis acceleration associated with falling (e.g., 9.8 m/s^2 due to gravity).

When the first data includes two or more estimated positions of the mobile device (e.g., from a positioning application of the mobile device, proximities to access points, or from another known positioning technique), determining the location context based on the first data that includes two or more estimated positions of the mobile device (e.g., consecutive estimated positions) uses any of different combinations of the conclusions described below with respect to sixth through tenth sets of embodiments.

In a sixth set of embodiments, the determined location context specifies an estimated location circumstance of the mobile device as being with a user who is on foot (e.g., walking or running) when the two or more estimated positions are indicative of a movement associated with a walking or running user. By way of example, the two or more estimated positions are indicative of a walking or running motion by the user when a velocity of the mobile phone (e.g., as calculated by dividing a distance between the two estimated positions by a time elapsed between when each of the estimated positions was determined) is above a first threshold associated with a minimum walking speed (e.g., 1 km/hr) and below a second threshold associated with a maximum running speed (e.g., 5 km/hr).

In a seventh set of embodiments, the determined location context specifies an estimated location circumstance of the mobile device as being on or with a user who is on a bike when the two or more estimated positions are indicative of a movement associated with a bike. By way of example, the two or more estimated positions are indicative of a movement associated with a bike when a velocity of the mobile phone (e.g., as calculated by dividing a distance between the two estimated positions by a time elapsed between when each of the estimated positions was determined) is above the second threshold associated with a maximum running speed (e.g., 5 km/hr) and below a third threshold associated with a maximum bike speed or associated with a speed below which a vehicle is unlikely to be traveling (e.g., 10 km/hr).

In an eighth set of embodiments, the determined location context specifies an estimated location circumstance of the mobile device as being in a vehicle when the two or more estimated positions are indicative of a movement associated with a vehicle. By way of example, the two or more estimated positions are indicative of a movement associated with a vehicle when a velocity of the mobile phone (e.g., as calculated by dividing a distance between the two estimated positions by a time elapsed between when each of the estimated positions was determined) is above the third threshold associated with a maximum bike speed or associated with a speed below which a vehicle is unlikely to be traveling (e.g., 10 km/hr) and below a fourth threshold associated with a maximum speed of a vehicle (e.g., 200 km/hr).

In a ninth set of embodiments, the determined location context specifies an estimated location circumstance of the mobile device as being stationary when the two or more estimated positions are indicative of a movement associated with being stationary. By way of example, the two or more estimated positions are indicative of being stationary when a velocity of the mobile phone (e.g., as calculated by dividing a distance between the two estimated positions by a time elapsed between when each of the estimated positions was determined) is below the first threshold associated with a minimum walking speed (e.g., 1 km/hr) and optionally when a vertical velocity of the mobile device is below a vertical velocity threshold (e.g., 1 m/s).

In a tenth set of embodiments, the determined location context specifies an estimated location circumstance of the mobile device as being on the surface after being dropped when the two or more estimated positions are indicative of a movement associated with falling to and landing on the surface. By way of example, the two or more estimated positions are indicative of falling to and landing on the surface when the second estimated position is lower than the first estimated position, a vertical velocity of the mobile phone (e.g., as calculated by dividing a Z distance between the two estimated positions by a time elapsed between when each of the estimated positions was determined) is above a vertical velocity threshold (e.g., 1 m/s), and optionally a horizontal velocity of the mobile phone (e.g., as calculated by dividing an XY distance between the two estimated positions by a time elapsed between when each of the estimated positions was determined) is below the first threshold associated with a minimum walking speed (e.g., 1 km/hr).

When the first data includes an estimated position of the mobile device (e.g., from a positioning application of the mobile device, proximity to an access point, or from another known positioning technique), the determined location context may specify that the mobile device is at a known location (e.g., the user's residence, the user's work, or another discernable location). Alternatively, the determined location context may specify that the mobile device is (i) with a user who is on foot if the estimated position is on (or within a threshold distance to) a shopping venue, a fitness venue, a public park or other venue where the user is likely to be walking or running with the mobile device, (ii) on or with a user on a bike if the estimated position is on (or within a threshold distance to) a bike path where the user is likely to be riding a bike with the mobile device, (iii) in a vehicle if the estimated position is on (or within a threshold distance to) a highway or expressway, (iv) stationary if the estimated position is at the user's residence or workplace.

When the first data includes measurement values determined by a pressure sensor of the mobile device, the determined location context may specify that the mobile device is in a vehicle when the measurement values are turbulent (e.g., measurements of pressure are spread out and vary considerably from one to the other), which occurs when ambient air passes over and around a moving vehicle and the pressure inside the vehicle varies. By way of example, turbulent measurement values can be quantified as (1) the variance or standard deviation of the last N pressure measurements (N=10, for example), over the last T seconds (T=5 s, for example), such that if the standard deviation exceeds a threshold (e.g. 10 Pa, for example), the location context is likely "in a vehicle", or (2) the range or maximum minus minimum of measurements collected of the last N pressure measurements (N=10, for example), over the last T seconds (T=5 s, for example), such that if the range exceeds a threshold (e.g. 20 Pa, for example), the location context is likely "in a vehicle".

Second Data

Step 230 of FIG. 2A and step 265 of FIG. 2B identify second data to retrieve based on different considerations (e.g., a determined location context or two more possible estimated heights above a surface at which a mobile device may reside). Such second data may include one or more of (i) at least one measurement value determined by at least one sensor of the mobile device, (ii) at least one status indicator value of a feature of the mobile device, or both (i) and (ii).

Examples of measurements determined by a sensor of the mobile device include:
- (i) a measurement of orientation retrieved from a gyroscope sensor of the mobile device (e.g., by querying the gyroscope sensor API on the mobile device, as is known), where a measurement of orientation may specify three angles in three-dimensional space at which three planes (i.e., XY, XZ, YZ) are respectively located at the time the measurement of orientation is made, which can be used to determine if the mobile device is upright, not upright, flat or not flat, as described further below;
- (ii) a measurement of light from light sensor of the mobile device (e.g., by querying the light sensor API on the mobile device, as is known), where the measurement of light may be measured in lux and may specify an intensity of light received by the light sensor (e.g., a camera of the mobile device), which can be used to determine if the mobile device's surfaces are obscured (e.g., by a cover, by being placed in a pocket or bag, or by being placed face down on a counter or table); and/or
- (iii) a measurement of sound from a microphone of the mobile device (e.g., obtained by querying an API on the mobile device, as is known), which can be used to determine if the mobile device is likely to be in close proximity (e.g., less than a half a meter) from the user's mouth.

Examples of status indicators of features of the mobile device include:
- (i) a motion status indicator from a pedometer of the mobile device (e.g., obtained by querying a pedometer API on the mobile device, as is known), that specifies if a walking or running motion has been registered by registering steps at a frequency associated with walking or a frequency associated with running, or registering a peddling motion associated with biking, which can be used to determine if the mobile phone is with a user who is walking, running or biking;
- (ii) a measurement of battery temperature from a temperature sensor of the mobile device that measures internal temperature of the mobile phone near the battery (e.g., obtained by querying a API on the mobile device, as is known), which can be used to confirm if the mobile device is outside or inside a bag with little to no ambient airflow to cool down the mobile device;
- (iii) a phone call status indicator (e.g., obtained by querying an API on the mobile device, as is known), which can be used to determine if the user is actively engaged in a phone call;
- (iv) a "hands-free" calling status indicator (e.g., obtained by querying an API on the mobile device, as is known), which can be used to determine if the user is actively engaged in a phone call while also determining that the mobile device is unlikely to be oriented upright against the user's ear (since the hands-free feature is engaged with a wired or wireless microphone and speaker adaptor to enables a hands-free experience), and is instead held front of the user (e.g., for a video chat), held at the user's waist, or put in the user's pocket or bag;
- (v) a speaker calling status indicator (e.g., obtained by querying an API on the mobile device, as is known), which can be used to determine if the user is actively engaged in a phone call while also determining that the mobile device is unlikely to be oriented upright against the user's ear or unlikely to be held at the user's waist or put in the user's pocket or bag (since the speaker feature is engaged), and instead is likely to be held below the user's mouth in an upper torso area of the user;
- (vi) a video calling status indicator (e.g., obtained by querying an API on the mobile device or determining a camera and a phone call are simultaneously active, as is known), which can be used to determine if the user is actively engaged in a phone call while also determining that the mobile device is unlikely to be oriented upright against the user's ear or unlikely to be held at the user's waist or put in the user's pocket or bag (since the video camera feature is engaged), and instead is likely to be held in view of the user's head in an upper torso area of the user;
- (vii) a video recording status indicator (e.g., obtained by querying an API on the mobile device, as is known), which can be used to determine if a user is recording a video using the mobile device and that the mobile device is not inside a bag or a pocket of the user or that the mobile device is not being used for a phone call;
- (viii) a speedometer use status indicator (e.g., obtained by querying an API on the mobile device, as is known) specifying if measurements of a speedometer are being displayed, which can be used to determine that the mobile device is likely to be positioned in view of the user; and/or (ix) a battery charging status indicator (e.g., obtained by querying an API on the mobile device, as is known), which can be used to determine if the mobile device is plugged into a power source, and depending on a measurement of voltage, the power source could be determined to be a wall outlet, a computer, a car inverter, a portable battery pack, or another type of power source, which can aid in determining if the mobile device is likely on furniture like a desk or on the ground or floor (e.g., power source is a wall outlet or a computer), resting on a car console (e.g., power source is a car inverter), or in a pocket or a bag of a user (e.g., power source is a portable charger).

Values of different types of data discussed above may be retrieved during step 240 or step 275 and used to determine an estimated height above a surface at which the mobile device is located during step 250 or step 285 of FIG. 2A or FIG. 2B, respectively.

Estimating a Height Above a Surface at which the Mobile Device is Located

Different methods for estimating a height above a surface at which the mobile device is location are described in FIG. 3A through FIG. 3H below.

Figure 3A:
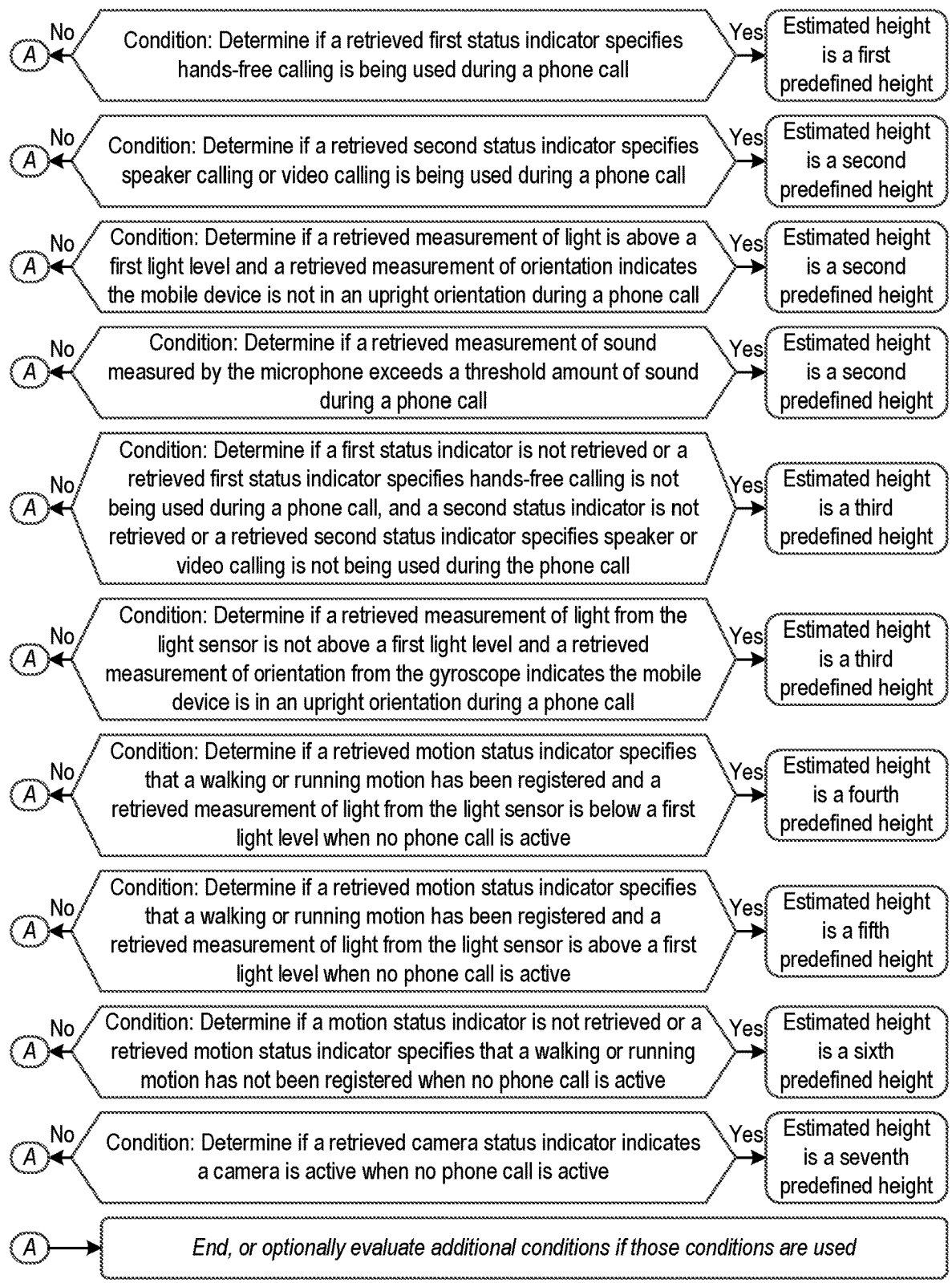
FIG. 3A-H depict processes for estimating a height above a surface at which the mobile device is located based on a determined location context and other data.

A first method for estimating the height above a surface at which the mobile device is located when the determined location context is with a user who is on foot is shown in FIG. 3A. The first method may be used when the second data includes different combinations of measurements or indicators that are used by different approaches described below. By way of example, different combinations of measurements or indicators may include any of: a first status indicator specifying if wired or wireless hands-free calling is being used, a second status indicator specifying if speaker phone calling or video calling is being used, a measurement of light from a light sensor of the mobile device, a measurement of orientation from a gyroscope of the mobile device, a motion status indicator from a pedometer of the mobile device specifying if a walking or running motion has been registered, a measurement of sound from a microphone of the mobile device, or a camera status indicator indicating a camera (e.g., front-facing camera) of the mobile phone is active. A determination is made as to whether the mobile device is being used to execute a phone call, which may be determined by retrieving (or not being able to retrieve) a phone call status indicator that specifies the mobile device is being used to execute a phone call, or a phone call status indicator that specifies the mobile device is not being used to execute a phone call. The estimated height above the surface at which the mobile device is located is determined using one or more of the following approaches for determining the estimated height.

(i) A first approach determines the estimated height is a first predefined height if the mobile device is being used to execute a phone call, and if the first status indicator is retrieved and specifies hands-free calling is being used during the phone call. By way of example, the first predefined height is set to an assumed height of a user's waist, such as 1.0 meters or a predefined percentage like 50% of a user's height if obtainable from profile data of the user, which is an assumed location at which a mobile device is held by a user or stored in the user's pocket when hands-free calling is being used during the phone call.

(ii) A second approach determines the estimated height is a second predefined height if the mobile device is being used to execute a phone call and if any of the following conditions apply: (i) the second status indicator is retrieved and specifies speaker calling or video calling is being used during the phone call, or (ii) the measurement of light from the light sensor of the mobile device is retrieved and is above a first light level (and optionally below a second light level), and the measurement of orientation from the gyroscope of the mobile device is retrieved and indicates the mobile device is not in an upright orientation and optionally the first status indicator is not retrieved or a retrieved first status indicator specifies hands-free calling is not being used during the phone call, or (iii) the measurement of sound from the microphone exceeds a threshold amount of sound associated with user speech that is emitted within less than a half a meter from the microphone. Different embodiments of this approach may consider different combinations of the preceding enumerated conditions (e.g., only one, some, or all). By way of example, the second predefined height is set to an assumed height of a user's upper torso, such as 1.5 meters or a predefined percentage like 75% of a user's height if obtainable from profile data of the user, which is an assumed location at which a mobile device is held by a user when speaker phone calling or video phone calling is being used during the phone call or when the light sensor is exposed to light (e.g., uncovered) and the mobile device is unlikely to be held against the user's ear (e.g., not in an upright orientation) but close enough for a microphone of the mobile device to receive the user's voice and for a speaker to be heard by the user. Examples of light levels include a first light level of 10,000 lux and a second light level of 20,000 lux. An example of a threshold amount of sound includes 50 dB. An upright orientation may be defined in different ways. In one implementation, where a mobile device lies in standard Cartesian coordinates (XYZ), then the mobile device is in an upright orientation when an angle between a surface of a screen of the mobile device and the Z-axis (or the ZX axial plane or the ZY axial plane) is within a maximum threshold (e.g., 20 degrees), and the mobile phone is not in the upright orientation when the angle between the surface of the screen of the mobile device and the Z-axis (or the ZX axial plane or the ZY axial plane) is not within the maximum threshold (e.g., 20 degrees).

(iii) A third approach determines the estimated height is a third predefined height if the mobile device is being used to execute a phone call and any of the following conditions apply: (i) if the first status indicator is not retrieved or a retrieved first status indicator specifies hands-free calling is not being used during the phone call, and the second status indicator is not retrieved or a retrieved second status indicator specifies speaker or video calling is not being used during the phone call, or (ii) if the measurement of light from the light sensor of the mobile device is retrieved and is not above the first light level, and if the measurement of orientation from the gyroscope of the mobile device is retrieved and indicates the mobile device is in the upright orientation. Different embodiments of this approach may consider different combinations of the preceding enumerated conditions (e.g., only one, some, or all). By way of example, the third predefined height is set to an assumed height of a user's ear, such as 2.0 meters or a predefined percentage like 95% or higher of a user's height if obtainable from profile data of the user, which is an assumed location at which a mobile device is held by a user when no hands-free or speaker calling is being used during the phone call, or when no or low light is detected while the mobile device is held upright against the user's ear.

(iv) A fourth approach determines the estimated height is a fourth predefined height if the mobile device is not being used to execute a phone call, if the motion status indicator is retrieved and specifies that a walking or running motion has been registered, and if the measurement of light from the light sensor of the mobile device is below a first light level. By way of example, the fourth predefined height is set to an assumed height of a user's waist, such as 1.0 meters or a predefined percentage like 50% of a user's height if obtainable from profile data of the user, which is an assumed location at which a mobile device is stored in the user's pocket when no phone call is active and the light sensor (e.g., a camera) is covered.

(v) A fifth approach determines the estimated height is a fifth predefined height if the mobile device is not being used to execute a phone call, if the motion status indicator is retrieved and specifies that a walking or running motion has been registered, and if the measurement of light from the light sensor of the mobile device is above the first light level (or a different light level). By way of example, the fifth predefined height is set to an assumed height of a user's upper torso, such as 1.5 meters or a predefined percentage like 75% of a user's height if obtainable from profile data of the user, which is an assumed location at which a mobile device is carried on a user's arm when the user is walking or running under the preceding sensed conditions.

(vi) A sixth approach determines the estimated height is a sixth predefined height if the mobile device is not being used to execute a phone call and if the motion status indicator is not retrieved or a retrieved motion status indicator specifies that a walking or running motion has not been registered. By way of example, the sixth predefined height is set to an assumed height of a wheeled bag being pulled or pushed by the user, such as 0.5 meters or a predefined percentage like 25% of a user's height if obtainable from profile data of the user, which is an assumed location at which a mobile device resides when steps of the user are not detected while the user is assumed to be walking.

(vii) A seventh approach determines the estimated height is a seventh predefined height if the mobile device is not being used to execute a phone call and the camera status indicator indicates a camera (e.g., front camera) is active (e.g., capturing images). By way of example, the seventh predefined height is set to an assumed height of a user's face, such as 2.0 meters or a predefined percentage like 95% or higher of a user's height if obtainable from profile data of the user, which is an assumed location at which a mobile device is held when a user is taking selfies.

Any number of the above approaches—e.g., from only one to all—may be used in different embodiments of the first method.

Figure 3B:

A second method for estimating the height above a surface at which the mobile device is located when the determined location context is with a user who is on foot is shown in FIG. 3B.

The second method may be used when the second data includes different combinations of measurements or indicators that are used by different approaches described below. By way of example, different combinations of measurements or indicators may include any of: a first status indicator specifying if wired or wireless hands-free calling is being used, a second status indicator specifying if speaker phone or video calling is being used, a measurement of light from a light sensor of the mobile device, or a measurement of orientation from a gyroscope of the mobile device.

A determination is made that the mobile device is being used to execute a phone call, which may be determined by retrieving a phone call status indicator that specifies the mobile device is being used to execute a phone call.

The estimated height above the surface at which the mobile device is located is determined using one or more of the following approaches for determining the estimated height.

(i) A first approach determines the estimated height is a first predefined height if the mobile device is being used to execute a phone call, and if the first status indicator is retrieved and specifies hands-free calling is being used during the phone call. By way of example, the first predefined height is set to an assumed height of a user's waist, such as 1.0 meters or a predefined percentage like 50% of a user's height if obtainable from profile data of the user, which is an assumed location at which a mobile device is held by a user or stored in the user's pocket when hands-free calling is being used during the phone call.

(ii) A second approach determines the estimated height is a second predefined height if the mobile device is being used to execute a phone call and if any of the following conditions apply: (i) the second status indicator is retrieved and specifies speaker calling or video calling is being used during the phone call, or (ii) the measurement of light from the light sensor of the mobile device is retrieved and is above a first light level (and optionally below a second light level), and the measurement of orientation from the gyroscope of the mobile device is retrieved and indicates the mobile device is not in an upright orientation and optionally the first status indicator is not retrieved or a retrieved first status indicator specifies hands-free calling is not being used during the phone call, or (iii) the measurement of sound from the microphone exceeds a threshold amount of sound associated with user speech that is emitted within less than a half a meter from the microphone. Different embodiments of this approach may consider different combinations of the preceding enumerated conditions (e.g., only one, some, or all). By way of example, the second predefined height is set to an assumed height of a user's upper torso, such as 1.5 meters or a predefined percentage like 75% of a user's height if obtainable from profile data of the user, which is an assumed location at which a mobile device is held by a user when speaker phone calling or video phone calling is being used during the phone call or when the light sensor is exposed to light (e.g., uncovered) and the mobile device is unlikely to be held against the user's ear (e.g., not in an upright orientation) but close enough for a microphone of the mobile device to receive the user's voice and for a speaker to be heard by the user. Examples of light levels include a first light level of 10,000 lux and a second light level of 20,000 lux. An example of a threshold amount of sound includes 50 dB. An upright orientation may be defined in different ways. In one implementation, where a mobile device lies in standard Cartesian coordinates (XYZ), then the mobile device is in an upright orientation when an angle between a surface of a screen of the mobile device and the Z-axis (or the ZX axial plane or the ZY axial plane) is within a maximum threshold (e.g., 20 degrees), and the mobile phone is not in the upright orientation when the angle between the surface of the screen of the mobile device and the Z-axis (or the ZX axial plane or the ZY axial plane) is not within the maximum threshold (e.g., 20 degrees).

(iii) A third approach determines the estimated height is a third predefined height if the mobile device is being used to execute a phone call and any of the following conditions apply: (i) if the first status indicator is not retrieved or a retrieved first status indicator specifies hands-free calling is not being used during the phone call, and the second status indicator is not retrieved or a retrieved second status indicator specifies speaker or video calling is not being used during the phone call, or (ii) if the measurement of light from the light sensor of the mobile device is retrieved and is not above the first light level, and the measurement of orientation from the gyroscope of the mobile device is retrieved and indicates the mobile device is in the upright orientation. Different embodiments of this approach may consider different combinations of the preceding enumerated conditions (e.g., only one, some, or all). By way of example, the third predefined height is set to an assumed height of a user's ear, such as 2.0 meters or a predefined percentage like 95% or higher of a user's height if obtainable from profile data of the user, which is an assumed location at which a mobile device is held by a user when no hands-free or speaker calling is being used during the phone call, or when no or low light is detected while the mobile device is held upright against the user's ear.

Any number of the above approaches—e.g., from only one to all—may be used in different embodiments of the second method.

Figure 3C:
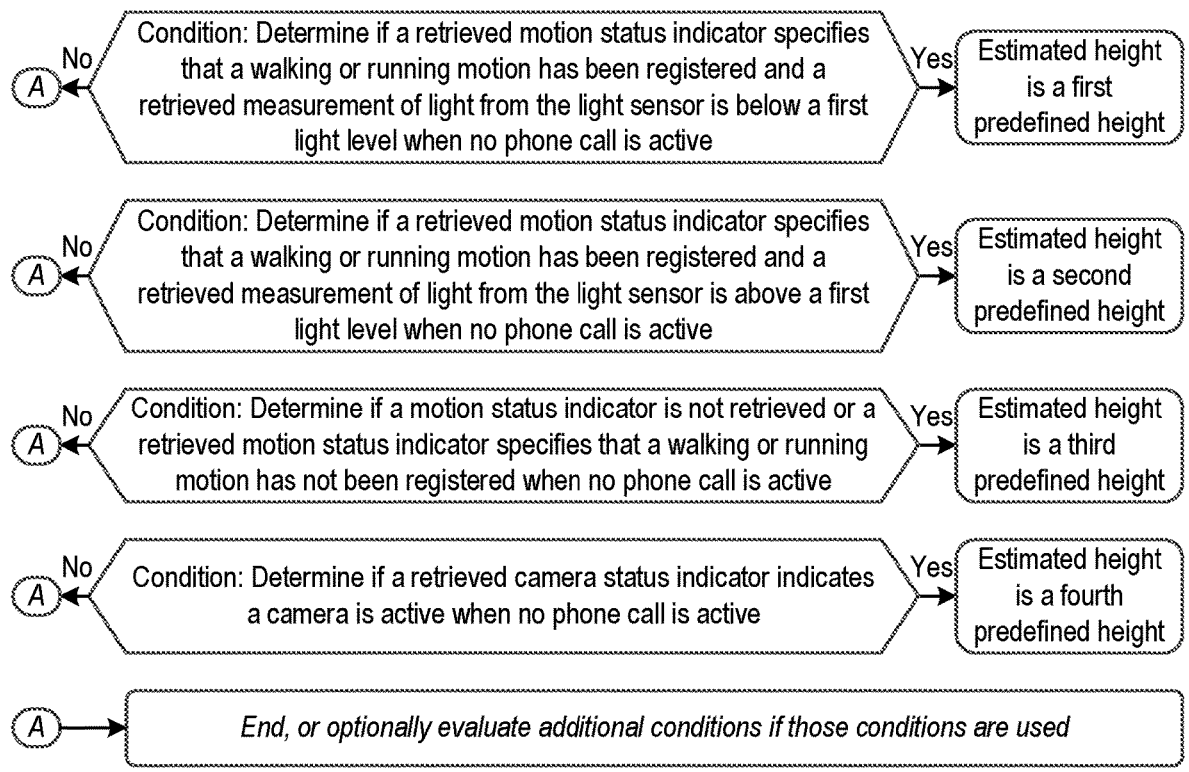

A third method for estimating the height above a surface at which the mobile device is located when the determined location context is with a user who is on foot is shown in FIG. 3C.

The third method may be used when the second data includes different combinations of measurements or indicators that are used by different approaches described below. By way of example, different combinations of measurements or indicators may include any of: a motion status indicator from a pedometer of the mobile device specifying if a walking or running motion has been registered, or a measurement of light from a light sensor of the mobile device.

A determination is made that the mobile device is not being used to execute a phone call, which may be determined by retrieving a phone call status indicator that specifies the mobile device is not being used to execute a phone call, or by not being able to retrieve a phone call status indicator that specifies the mobile device is being used to execute a phone call.

The estimated height above the surface at which the mobile device is located is determined using one or more of the following approaches for determining the estimated height.

(i) A first approach determines the estimated height is a first predefined height if the mobile device is not being used to execute a phone call, if the motion status indicator is retrieved and specifies that a walking or running motion has been registered, and if the measurement of light from the light sensor of the mobile device is below a first light level. By way of example, the first predefined height is set to an assumed height of a user's waist, such as 1.0 meters or a predefined percentage like 50% of a user's height if obtainable from profile data of the user, which is an assumed location at which a mobile device is stored in the user's pocket when no phone call is active and the light sensor (e.g., a camera) is covered.

(ii) A second approach determines the estimated height is a second predefined height if the mobile device is not being used to execute a phone call, if the motion status indicator is retrieved and specifies that a walking or running motion has been registered, and if the measurement of light from the light sensor of the mobile device is above the first light level (or a different light level). By way of example, the second predefined height is set to an assumed height of a user's upper torso, such as 1.5 meters or a predefined percentage like 75% of a user's height if obtainable from profile data of the user, which is an assumed location at which a mobile device is carried on a user's arm when the user is walking or running under the preceding sensed conditions.

(iii) A third approach determines the estimated height is a third predefined height if the mobile device is not being used to execute a phone call and if the motion status indicator is not retrieved or a retrieved motion status indicator specifies that a walking or running motion has not been registered. By way of example, the third predefined height is set to an assumed height of a wheeled bag being pulled or pushed by the user, such as 0.5 meters or a predefined percentage like 25% of a user's height if obtainable from profile data of the user, which is an assumed location at which a mobile device resides when steps of the user are not detected while the user is assumed to be walking.

(iv) A fourth approach determines the estimated height is a fourth predefined height if the mobile device is not being used to execute a phone call and the camera status indicator indicates a camera (e.g., front camera) is active (e.g., capturing images). By way of example, the fourth predefined height is set to an assumed height of a user's face, such as 2.0 meters or a predefined percentage like 95% or higher of a user's height if obtainable from profile data of the user, which is an assumed location at which a mobile device is held when a user is taking selfies.

Any number of the above approaches—e.g., from only one to all—may be used in different embodiments of the third method.

Figure 3D:
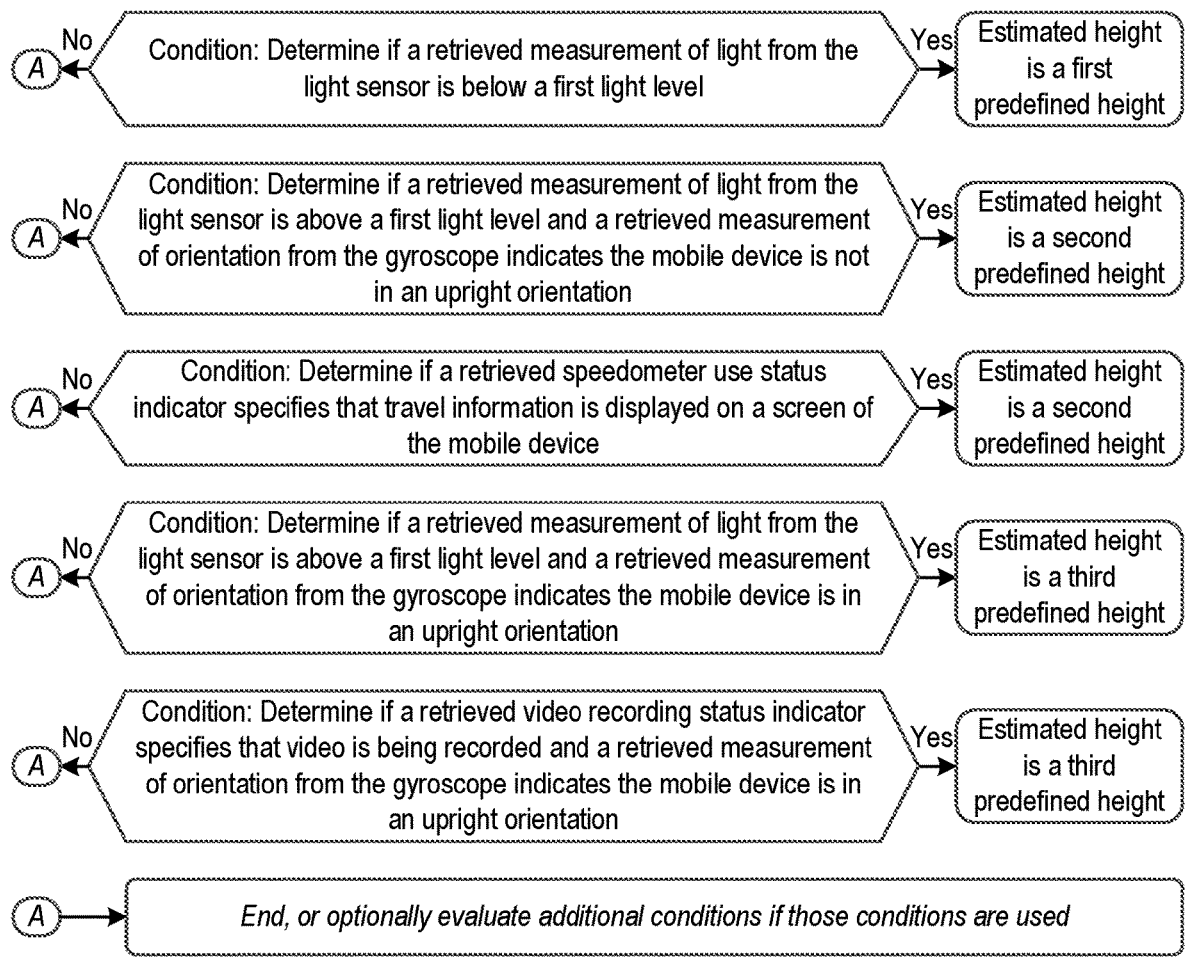

A fourth method for estimating the height above a surface at which the mobile device is located when the determined location context is on a bike or with a user who is on a bike is shown in FIG. 3D.

The fourth method may be used when the second data includes different combinations of measurements or indicators that are used by different approaches described below. By way of example, different combinations of measurements or indicators may include any of: a measurement of light from a light sensor of the mobile device, a measurement of orientation from a gyroscope of the mobile device, a video recording status indicator specifying if video is being recorded by a camera of the mobile device, or a speedometer use status indicator specifying if travel information displayed on a screen of the mobile device. By way of example, travel information may include speed, distance traveled, or other data.

The estimated height above the surface at which the mobile device is located is determined using one or more of the following approaches for determining the estimated height.

(i) A first approach determines the estimated height is a first predefined height if the measurement of light from the light sensor of the mobile device is retrieved and is below a first light level. By way of example, the first predefined height is set to an assumed height of a bike feature like a seat or a bag attached to the bike or carried by a user, such as 1.0 meters or an actual height of the bike feature if obtainable from profile data of the user, which is an assumed location at which a mobile device is stored in a user's pocket or a bag when the user is riding a bike and no light above a certain level is detected.

(ii) A second approach determines the estimated height is a second predefined height if any of the following conditions apply: (i) the measurement of light from the light sensor of the mobile device is retrieved and is above the first light level (or another light level), and the measurement of orientation from the gyroscope of the mobile device is retrieved and indicates the mobile device is not in an upright orientation, or (ii) the speedometer use status indicator is retrieved and specifies that travel information is displayed on a screen of the mobile device. Different embodiments of this approach may consider different combinations of the preceding enumerated conditions (e.g., only one, some, or all). By way of example, the second predefined height is set to an assumed height of a bike feature like a handlebar, such as 1.0 meters or an actual height of the bike feature if obtainable from profile data of the user, which is an assumed location at which a mobile device is carried when the user is riding a bike, light above a certain level is detected and the orientation if not upright so as to allow the user to view the screen of the mobile device while riding the bike. An upright orientation may be defined in different ways. In one implementation, where a mobile device lies in standard Cartesian coordinates (XYZ), then the mobile device is in an upright orientation when an angle between a surface of a screen of the mobile device and the Z-axis (or the ZX axial plane or the ZY axial plane) is within a maximum threshold (e.g., 20 degrees), and the mobile phone is not in the upright orientation when the angle between the surface of the screen of the mobile device and the Z-axis (or the ZX axial plane or the ZY axial plane) is not within the maximum threshold (e.g., 20 degrees).

(iii) A third approach determines the estimated height is a third predefined height if any of the following conditions apply: (i) the measurement of light from the light sensor of the mobile device is retrieved and is above the first light level (or another light level), and the measurement of orientation from the gyroscope of the mobile device is retrieved and indicates the mobile device is in the upright orientation, or (ii) the video recording status indicator specifies that video is being recorded and the measurement of orientation from the gyroscope of the mobile device is retrieved and indicates the mobile device is in the upright orientation. Different embodiments of this approach may consider different combinations of the preceding enumerated conditions (e.g., only one, some, or all). By way of example, the third predefined height is set to an assumed height of a bike's handlebars or a user's head when riding on that bike, such as 1.0 or 2.0 meters, which are assumed locations at which a mobile device is carried when the mobile device is recording video. Since two locations of different heights are assumed as possible locations for the mobile device, additional processing can be performed to select from the different locations (e.g., images recorded by a camera of the mobile device can be viewed to determine if a particular item like the user's hands or handlebars can be seen at a particular part of the image like the bottom of the image, and a conclusion is made that the assumed height is the user's head of 2.0 meters since the particular item is recognized as the particular part of the image).

Any number of the above approaches—e.g., from only one to all—may be used in different embodiments of the fourth method.

Figure 3E:
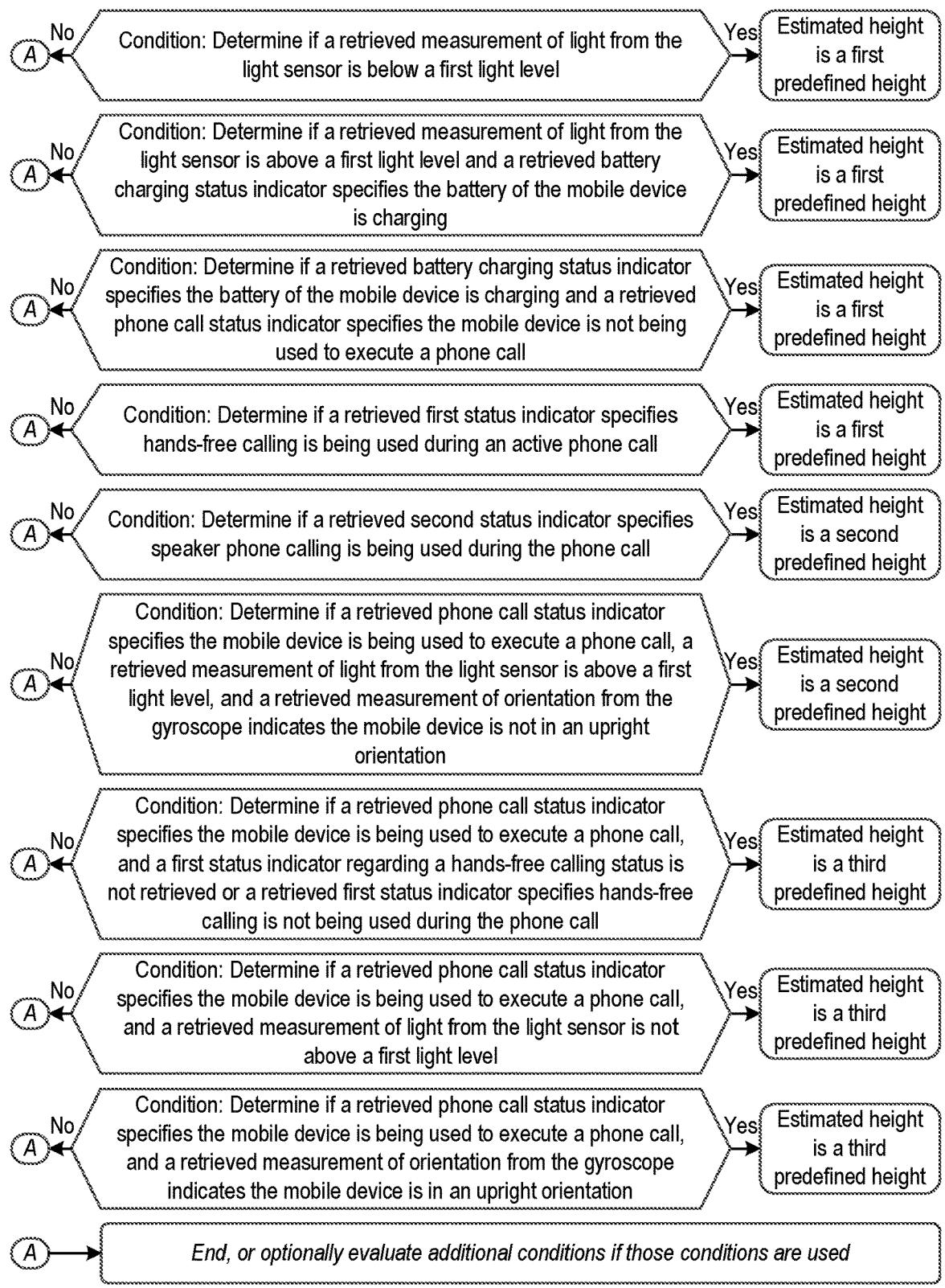

A fifth method for estimating the height above a surface at which the mobile device is located when the determined location context is in a vehicle is shown in FIG. 3E.

The fifth method may be used when the second data includes different combinations of measurements or indicators that are used by different approaches described below. By way of example, different combinations of measurements or indicators may include any of: a measurement of light from a light sensor of the mobile device, a measurement of orientation from a gyroscope of the mobile device, a battery charging status indicator specifying if a battery of the mobile device is charging, a phone call status indicator that specifies if the mobile device is being used to execute a phone call, a first status indicator specifying if wired or wireless hands-free calling is being used during an active phone call, or a second status indicator specifying if speaker phone calling is being used during an active phone call.

The estimated height above the surface at which the mobile device is located is determined using one or more of the following approaches for determining the estimated height.

(i) A first approach determines the estimated height is a first predefined height if any of the following conditions apply: (i) the measurement of light from the light sensor of the mobile device is retrieved and is below a first light level, or (ii) the measurement of light from the light sensor of the mobile device is retrieved and is above the first light level (or another light level) and the battery charging status indicator is retrieved and specifies the battery of the mobile device is charging, or (iii) the battery charging status indicator is retrieved and specifies the battery of the mobile device is charging and the phone call status indicator is retrieved and specifies the mobile device is not being used to execute a phone call, or (iv) the first status indicator is retrieved and specifies hands-free calling is being used during an active phone call. Different embodiments of this approach may consider different combinations of the preceding enumerated conditions (e.g., only one, some, or all). By way of example, the first predefined height is set to an assumed height of seat in a vehicle, such as 0.75 meters or an actual height of the seat if obtainable from profile data of the user, which is an assumed location at which a mobile device is stored in a user's pocket, stored in a bag/purse on a seat, or lying face down on the seat, center console platform or lap of the user (when no light above a certain level is detected), lying face up on the seat, center console or lap (when light above a certain level is detected and a battery is charging, or when the battery is charging and no phone call is being made), or any of the previous assumed locations when hands-free calling is being used during an active call.

(ii) A second approach determines the estimated height is a second predefined height if any of the following conditions apply: (i) the second status indicator is retrieved and specifies speaker phone calling is being used during the phone call, or (ii) the phone call status indicator is retrieved and specifies the mobile device is being used to execute a phone call, the measurement of light from the light sensor of the mobile device is retrieved and is above the first light level, and the measurement of orientation from the gyroscope of the mobile device is retrieved and indicates the mobile device is not in an upright orientation. Different embodiments of this approach may consider different combinations of the preceding enumerated conditions (e.g., only one, some, or all). By way of example, the second predefined height is set to an assumed height of a user's upper torso while the user is seated in a vehicle seat such as 1.25 meters, or a predefined distance such as 0.5 meters above a height of the car seat if obtainable from profile data of the user, which is an assumed location at which a mobile device is held by a user when speaker phone calling is being used during the phone call.

(iii) A third approach determines the estimated height is a third predefined height if the phone call status indicator is retrieved and specifies the mobile device is being used to execute a phone call and any of the following conditions apply: (i) the first status indicator is not retrieved or specifies hands-free calling is not being used during the phone call (and optionally the second status indicator is not retrieved or specifies speaker calling is not being used during the phone call) or (ii) the measurement of light from the light sensor of the mobile device is retrieved and is not above the first light level (or another light level) or (iii) the measurement of orientation from the gyroscope of the mobile device is retrieved and indicates the mobile device is in an upright orientation. Different embodiments of this approach may consider different combinations of the preceding enumerated conditions (e.g., only one, some, or all). By way of example, the third predefined height is set to an assumed height of a user's ear while the user is seated in a vehicle seat such as 1.75 meters, or a predefined distance such as 1.0 meters above a height of the car seat if obtainable from profile data of the user, which is an assumed location at which a mobile device is held by a user when no hands-free or speaker calling is being used during the phone call.

Any number of the above approaches—e.g., from only one to all—may be used in different embodiments of the fifth method.

Figure 3F:
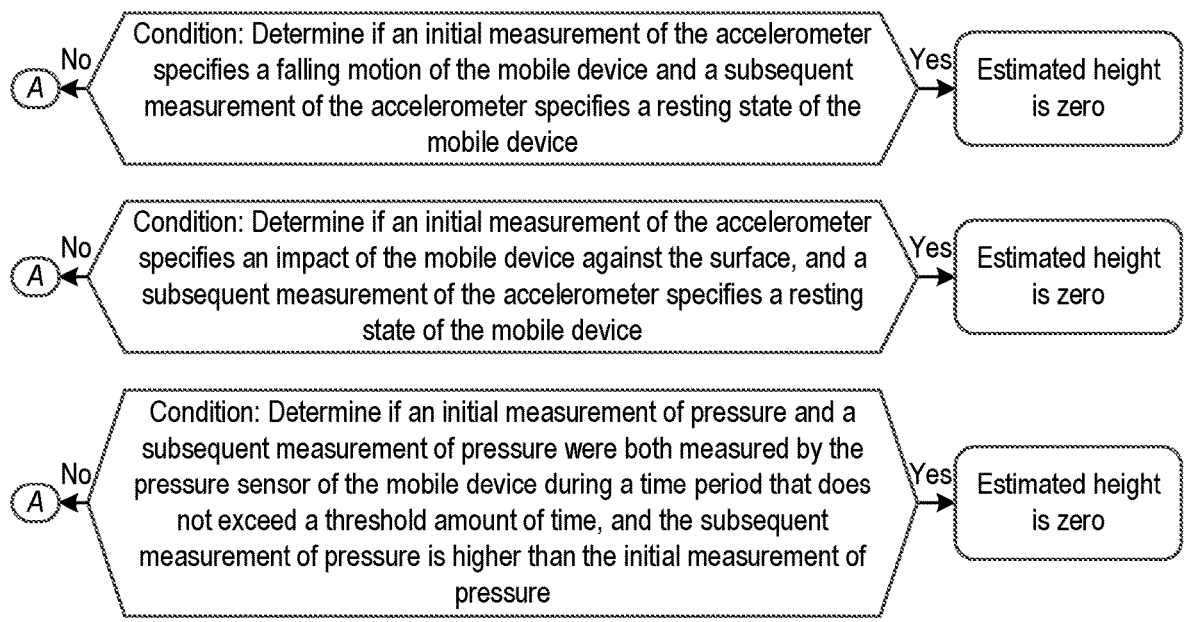

A sixth method for estimating the height above a surface at which the mobile device is located when the determined location context is on the surface after being dropped is shown in FIG. 3F.

The sixth method may be used when the second data includes different combinations of measurements or indicators that are used by different approaches described below. By way of example, different combinations of measurements or indicators may include any of: one or more measurements from an accelerometer of the mobile device and/or one or more measurements from a pressure sensor of the mobile device.

The estimated height above the surface at which the mobile device is located is determined using one or more of the following approaches for determining the estimated height.

(i) A first approach determines the estimated height is a first predefined height (e.g., 0 meters, which is an assumed location at which a mobile device is on the surface after the mobile device has been dropped) by determining a first measurement of the accelerometer specifies a fall (e.g., up to $g=9.8$ m/s$^2$ of acceleration along the z-axis) and a subsequent measurement of the accelerometer specifies a resting state (e.g., 0 m/s$^2$ of acceleration).

(ii) A second approach determines the estimated height is the first predefined height by determining a measurement of the accelerometer specifies an impact of the mobile device against a hard surface (e.g., up to $10*g=10*9.8$ m/s$^2$ of acceleration along the z-axis) and (optionally) a subsequent measurement of the accelerometer specifies a resting state (e.g., 0 m/s$^2$ of acceleration).

(iii) A third approach determines the estimated height is the first predefined height by determining that (i) a first measurement of pressure and a subsequent second measurement of pressure were both measured by the pressure sensor of the mobile device during a time period that does not exceed a threshold amount of time (e.g., 1 second), and (ii) the second measurement of pressure is higher than the first measurement of pressure, where the relatively higher second measurement of pressure reflects a relatively lower altitude of the mobile device after falling from a first altitude at which the first measurement of pressure was measured.

(iv) specifies a first pressure corresponding to a first altitude before a fall and a second measurement of the pressure sensor specifies a second (higher) pressure corresponding to a second (lower) altitude after the fall while the mobile device is in a resting state (i.e., additional pressure measurements are within a threshold amount of pressure associated with no movement of the mobile device, but accounting for possible error amount measurements of the same pressure). These values can be retrieved from cache and compared.

Any number of the above approaches—e.g., from only one to all—may be used in different embodiments of the sixth method.

In some embodiments, where a height is known before a mobile device is dropped, knowledge of the dropped location context of the mobile device can be used to determine a new height relative to the height before the mobile device was dropped. For example, a barometric formula ($h_{dropped}=-(RT/gM)\ln(Pressure_{before}/Pressure_{after})$) can be used to translate a pressure difference to an amount of height over which the mobile device dropped, and that amount of height can be subtracted from the height before the mobile device was dropped to determine the height of the mobile device after being dropped. By way of another example, an amount of z-axis acceleration over time or an acceleration impact value (e.g. $10*g$ or 98 m/s$^2$) can be mapped to an amount of height over which the mobile device dropped (e.g., where $10*g$ roughly translates to 1 m of falling, which may be determined from lab testing and be unique to each mobile device or mobile device cover/bumper), and that amount of height can be subtracted from the pre-drop height of the mobile device to determine the height of the mobile device after being dropped.

Figure 3G:
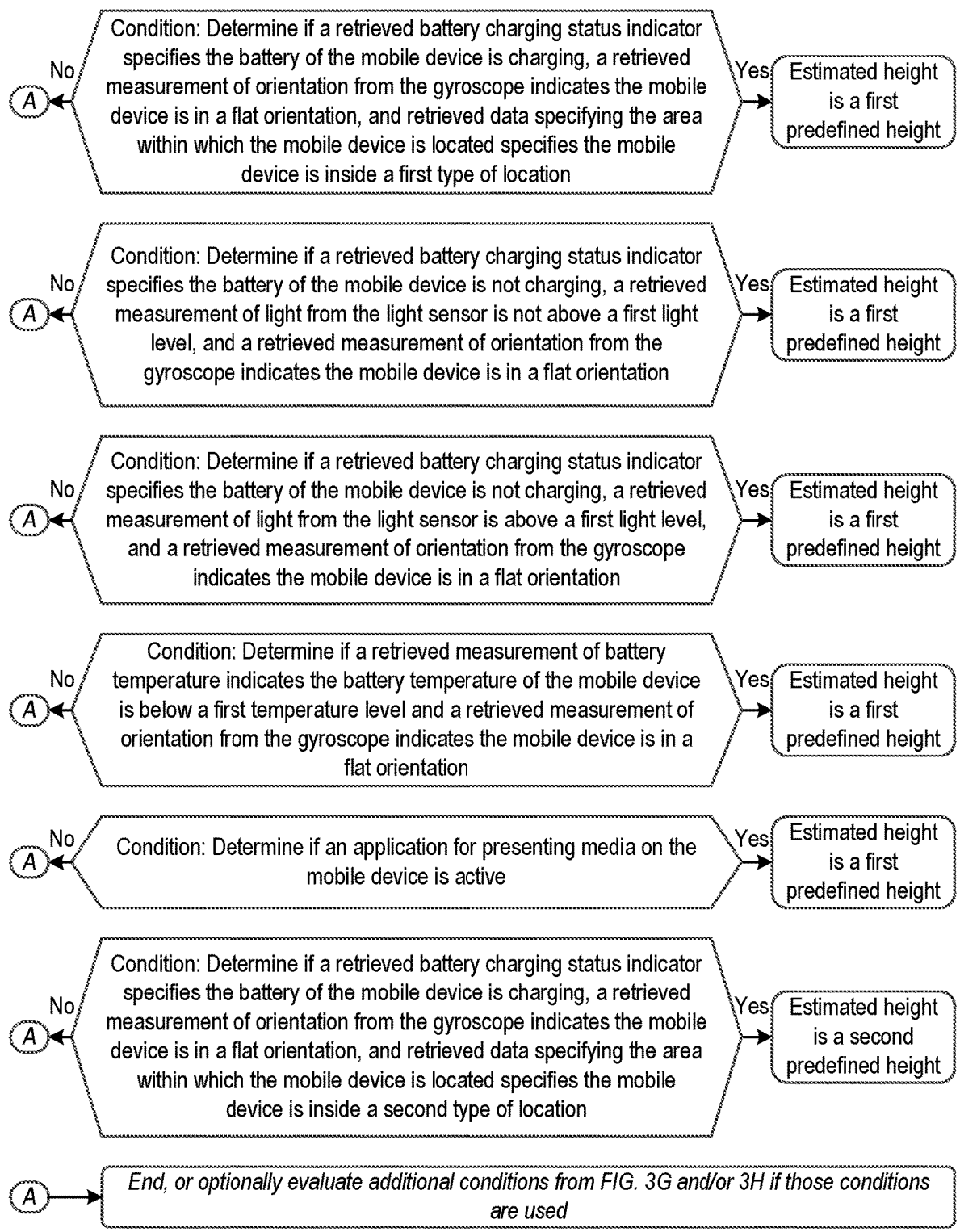
Figure 3H:
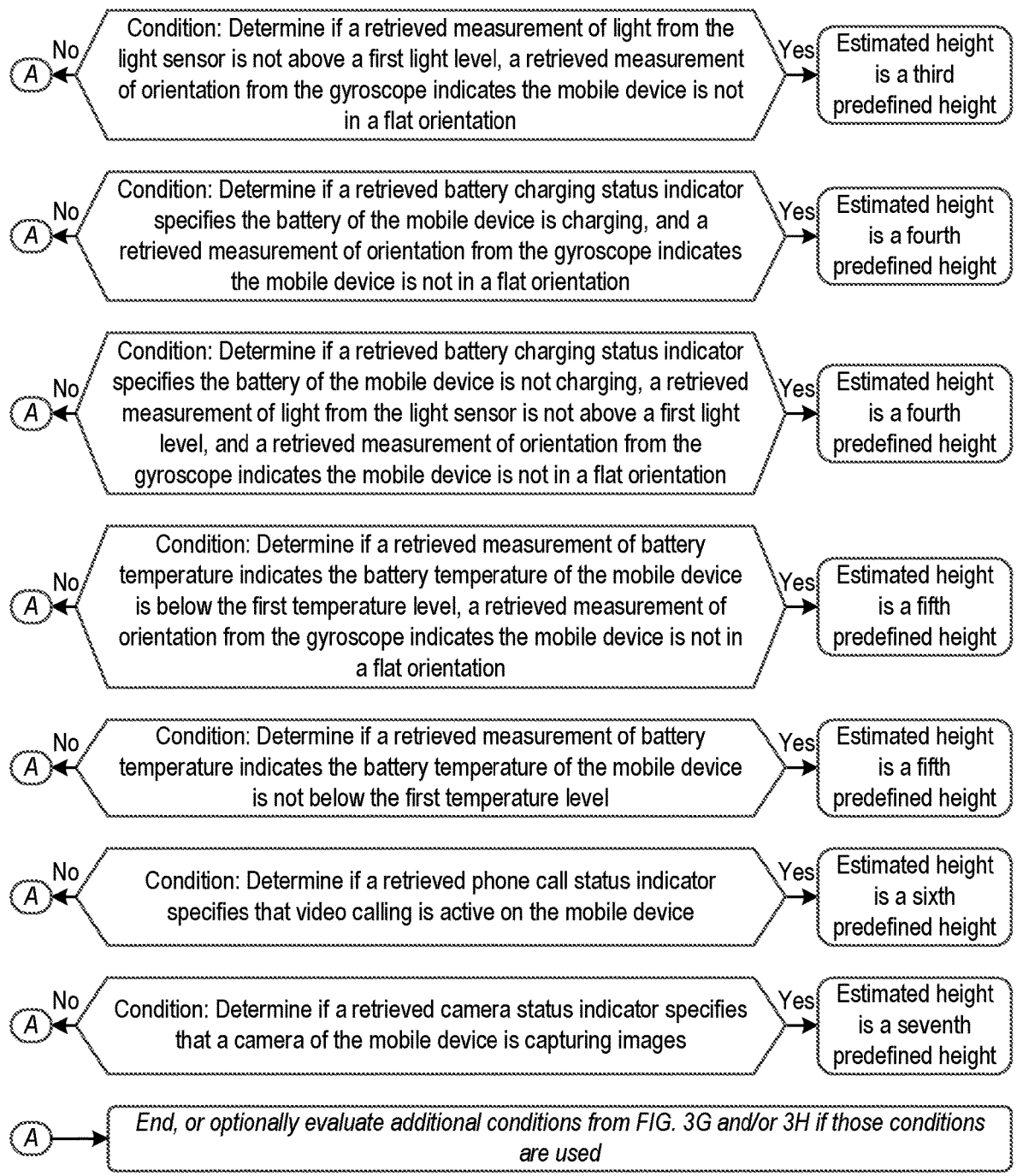

A seventh method for estimating the height above a surface at which the mobile device is located when the determined location context is stationary is shown in FIG. 3G and FIG. 3H.

The seventh method may be used when the second data includes different combinations of measurements or indicators that are used by different approaches described below. By way of example, different combinations of measurements or indicators may include any of: a battery charging status indicator specifying if a battery of the mobile device is charging, a measurement of orientation from a gyroscope of the mobile device, a measurement of light from a light sensor of the mobile device, a measurement of battery temperature from a temperature sensor of the mobile device, a phone call status indicator specifying if video calling is active, a camera status indicator specifying if a camera is capturing images, or data specifying an area within which the mobile device is located. By way of example, the data specifying an area within which the mobile device is located may be determined from detecting overlap between a known location of the area and an estimated position of the mobile device, from determining that the mobile device is communicating with an access point (e.g., a WiFi beacon) that is only accessible within the area, from receiving user input designating the area, or any other known approach that determines such an area.

The estimated height above the surface at which the mobile device is located is determined using one or more of the following approaches for determining the estimated height.

(i) A first approach determines the estimated height is a first predefined height if any of the following conditions apply: (i) the battery charging status indicator is retrieved and specifies the battery of the mobile device is charging, the measurement of orientation from the gyroscope of the mobile device is retrieved and indicates the mobile device is in a flat orientation, and the data specifying the area within which the mobile device is located is retrieved and specifies the mobile device is inside a first type of location in which the mobile phone is likely resting on a table, desk or counter top, or (ii) the battery charging status indicator is retrieved and specifies the battery of the mobile device is not charging, the measurement of light from the light sensor of the mobile device is retrieved and is not above a first light level, and the measurement of orientation from the gyroscope of the mobile device is retrieved and indicates the mobile device is in a flat orientation, or (iii) the battery charging status indicator is retrieved and specifies the battery of the mobile device is not charging, the measurement of light from the light sensor of the mobile device is retrieved and is above the first light level (or another light level), and the measurement of orientation from the gyroscope of the mobile device is retrieved and indicates the mobile device is in a flat orientation, or (iv) the measurement of battery temperature is retrieved and indicates the battery temperature of the mobile device is below a first temperature level, the measurement of orientation from the gyroscope of the mobile device is retrieved and indicates the mobile device is in a flat orientation, and (optionally) the battery charging status indicator is retrieved and specifies the battery of the mobile device is not charging, or (v) an application for presenting media (e.g., music or video) is active. Different embodiments of this approach may consider different combinations of the preceding enumerated conditions (e.g., only one, some, or all). By way of example, the first predefined height is set to an assumed height at a first type of location like a residence or a workplace of the user of a table, desk or counter top such as 1.0 meters or an actual height of the table, desk or countertop if obtainable from profile data of the user, which is an assumed location at which a mobile device is positioned when in a flat orientation and charging, when not charging with no sensed light above a threshold amount of light, when not charging with sensed light above the threshold amount of light, when battery temperature is below a threshold amount of temperature (e.g., 40 degrees Celsius) indicative of a maximum internal temperature of the mobile phone when the mobile phone is not enclosed in a thing like a bag or a pocket and has adequate airflow since the internal battery temperature in a mobile device is usually somewhere from 0-15 degrees Celsius hotter than ambient temperature, which is usually 25-40 degrees Celsius, or when a media-presenting application is actively outputting media. In one embodiment, the first temperature level is below 40 degrees Celsius. A flat orientation may be defined in different ways. In one implementation, where a mobile device lies in standard Cartesian coordinates (XYZ), then the mobile device is in a flat orientation when an angle between a screen of the mobile device and the XY-axial plane (or the X axis and/or the Y axis) is within a maximum threshold (e.g., 15 degrees), and the mobile phone is otherwise not in the flat orientation when the angle between the screen of the mobile device and the XY-axial plane (or the X axis and/or the Y axis) is not within the maximum threshold (e.g., 15 degrees).

(ii) A second approach determines the estimated height is a second predefined height if the battery charging status indicator is retrieved and specifies the battery of the mobile device is charging, if the measurement of orientation from the gyroscope of the mobile device is retrieved and indicates the mobile device is in the flat orientation, and if the data specifying the area within which the mobile device is located is retrieved and specifies the mobile device is inside a second type of location in which the mobile phone is likely positioned on a chair, a lap of the user, or in a pocket of a bag lying on the surface. By way of example, the second predefined height is set to an assumed height of part (e.g., compartment) of a bag resting on the surface, a seat, or a lap of a user such as 0.5 meters, or an actual height of pocket in the bag or the seat if obtainable from profile data of the user or another data source, which is an assumed location at which a mobile device is stored at a publicly-used space like an airport, mall, hospital, convention center, coffee shop or other place while the mobile device is charging. By way of example, the second type of location may be a residence or a workplace.

(iii) A third approach determines the estimated height is a third predefined height if the measurement of light from the light sensor of the mobile device is retrieved and is not above a first light level, the measurement of orientation from the gyroscope of the mobile device is retrieved and indicates the mobile device is not in a flat orientation and (optionally) the battery charging status indicator is retrieved and specifies the battery of the mobile device is not charging. By way of example, the third predefined height is set to an assumed height at which the mobile device is being held by a sitting or standing user for different purposes such as 1.0 to 2.0 meters, which is an assumed location at which a mobile device is positioned when being held by a user in a non-flat orientation for various purposes like viewing digital material or a game on a screen of the mobile device while sitting, or capturing images with a camera of the mobile device while standing. Additional conditions could be tested, such as determining if digital material is being displayed on the screen, images are being captured by the camera, or a game is actively displayed by the screen, and a particular height could be selected from a plurality of heights associated with the conditions—e.g., 1.0 meters if digital media or a game are displayed, 2.0 meters or an obtainable height of the user if images are being captured.

(iv) A fourth approach determines the estimated height is a fourth predefined height (e.g., 1.0 meters) or undeterminable if any of the following conditions apply: (i) the battery charging status indicator is retrieved and specifies the battery of the mobile device is charging, and the measurement of orientation from the gyroscope of the mobile device is retrieved and indicates the mobile device is not in the flat orientation, or (ii) the battery charging status indicator is retrieved and specifies the battery of the mobile device is not charging, the measurement of light from the light sensor of the mobile device is retrieved and is not above the first light level, and the measurement of orientation from the gyroscope of the mobile device is retrieved and indicates the mobile device is not in the flat orientation. Different embodiments of this approach may consider different combinations of the preceding enumerated conditions (e.g., only one, some, or all). By way of example, the fourth predefined height can be an average height of possible heights (e.g., average of 0.5 and 1.0 meters), or another type of height value, at which the mobile device is assumed to be potentially located when the mobile device is not in a flat orientation while its battery is charging, or when the mobile device is not in a flat orientation and is not sensing light while its battery is not charging, such as when the mobile device may be in a bag that is on the surface, a seat or table.

(v) A fifth approach determines the estimated height is a fifth predefined height (e.g., 1.0 meters) or undeterminable if any of the following conditions apply: (i) the measurement of battery temperature is retrieved and indicates the battery temperature of the mobile device is below the first temperature level, the measurement of orientation from the gyroscope of the mobile device is retrieved and indicates the mobile device is not in a flat orientation, and (optionally) the battery charging status indicator is retrieved and specifies the battery of the mobile device is not charging, or (ii) the measurement of battery temperature is retrieved and indicates the battery temperature of the mobile device is not below the first temperature level, and (optionally) the battery charging status indicator is retrieved and specifies the battery of the mobile device is not charging. Different embodiments of this approach may consider different combinations of the preceding enumerated conditions (e.g., only one, some, or all). By way of example, the fifth predefined height can be an average height of possible heights (e.g., average of 0.5 and 1.0 meters), or another type of height value, at which the mobile device is assumed to be potentially located when overheating or not in a flat orientation, such as when the mobile device may be not charging in a bag that is on the surface, a seat or table.

(vi) A sixth approach determines the estimated height is a sixth predefined height (e.g., 1.5 meters) if the phone call status indicator is retrieved and specifies that video calling is active. By way of example, the sixth predefined height is set to an assumed height of a standing user's upper torso, such as 1.5 meters or a predefined percentage like 75% of a user's height if obtainable from profile data of the user, which is an assumed location at which a mobile device is held by a user when video phone calling is active.

(vii) A seventh approach determines the estimated height is a seventh predefined height (e.g., 2.0 meters) if the camera status indicator is retrieved and specifies that a camera is capturing images. By way of example, the seventh predefined height is set to an assumed height of a standing user's face, such as 2.0 meters or a predefined percentage like 95% or higher of a user's height if obtainable from profile data of the user, which is an assumed location at which a mobile device is held when a user is taking selfies.

Any number of the above approaches—e.g., from only one to all—may be used in different embodiments of the seventh method.

Alternatively, the determined location context could be at a known location (e.g., a user's residence or work), and second data could include different types of data that could be used to determine a predefined height at which the mobile device is assumed to be located inside the known location. Uses of the types of data and conclusions about predefined heights could be the same uses and conclusions as the location contexts of stationary and with a user who is on foot, or additional uses and conclusions as to predefined heights.

Examples of particular types of data that may be retrieved include: (i) data indicating if a battery of the mobile device is charging, (ii) data indicating an orientation of the mobile device is in a particular orientation such as flat, not flat, upright, or not upright, (iii) data indicating a light sensor of the mobile device is measuring light above or below a first level of light, (iv) data indicating an inertial sensor of the mobile device measures particular types of movement (e.g., no movement of the mobile device, movement with a walking or running user), (v) data indicating a phone call is or is not active on the mobile device, (vi) data indicating hands-free calling or speaker calling is or is not being used during an active phone call, (vii) data indicating images are being captured by a camera of the mobile device, (viii) data indicating digital media or a game is being displayed on a screen of the mobile device, or (ix) data indicating a battery temperature is or is not below a first temperature level.

Examples of uses and conclusions may include any combination of one or more of: (a) concluding the predefined height of the mobile device is 1.0 meters or a height of a countertop, desk or table if data indicates that a battery of the mobile device is charging, or an orientation of the mobile device is in a flat orientation, or data indicating an inertial sensor of the mobile device measures no movement, or hands-free calling is being used during a phone call; (b) concluding the predefined height of the mobile device is 1.0 meters or a height at the middle of a sitting user's upper torso if data indicates that digital media or a game is being displayed on a screen of the mobile device; or (c) concluding the predefined height of the mobile device is 1.5 or 2.0 meters or a height of a user's ear when the user is respectively sitting or standing if data indicates that a phone call is active on the mobile device and the orientation of the phone is upright or no hands-free or speaker calling is active during the phone call where a selection of 1.5 meters could be made if no walking movement is detected by an inertial sensor, a selection of 2.0 meters could be made if walking movement is detected by an inertial sensor, an average of 1.75 meters is used if sitting or standing cannot be determined, or a first predefined height (e.g., 1.5 meters) is selected over a second predefined height (e.g., 2.0 meters) if the sum of a known altitude of the surface and the first predefined height is closer to an estimated altitude of the mobile device than the sum of the known altitude of the surface and the second predefined height.

Different embodiments are contemplated for performing different combinations of the processes described herein, including embodiments for performing different combinations of the processes enumerated for estimating a height above a surface at which the mobile device is located based on second data—e.g., the methods of FIG. 3A through FIG. 3H—and the methods enumerated for determining a location context based on first data—e.g., the first through tenth sets of embodiments and any other enumerated embodiments for determining a location context based on first data. By way of illustration, some embodiments may perform the methods of FIG. 3A, FIG. 3D, FIG. 3E, FIG. 3F, and FIGS. 4G-4H (where each embodiment performs different combinations of the approaches described for each method). Other embodiments may individually perform the method of FIG. 3A, FIG. 3D, FIG. 3E, FIG. 3F, and FIG. 4G-4H, or difference combinations thereof. When multiple types of second data are enumerated for a location context, not all enumerated types of second data for that location context need to be used, retrieved or tested against conditions to determine particular predefined heights. Different embodiments of a particular location context may use, retrieve and test different types of enumerated second data. For example, some embodiments use and retrieve only the type(s) of second data needed to test only one or some of the enumerated groups of conditions listed for determining if an enumerated predefined height is the estimated height. When multiple conditional tests of second data are enumerated as possible for determining when the estimated height is a particular predefined height, not all enumerated conditional tests of second data for that particular predefined height need to be performed, such that different embodiments of determining if the estimated height is a particular predefined height may test different types of second data against their respective conditions. When testing conditions of a group of second data types to determine if the estimated height is a particular predefined height, the testing of that group can stop when one of the conditions of one of the second data types is not satisfied. Similarly, when multiple predefined heights are enumerated as possible for a location context (e.g., first, second, . . . , Nth predefined heights), not all enumerated predefined heights need to be used or considered, such that different embodiments may determine if the estimated height is a predefined height from among different groups of enumerated predefined heights for a location context, wherein a group includes one or more predefined height. Thus, different embodiments may use different combinations of any of the enumerated location contexts, different types of the second data enumerated for those location contexts, and different predefined heights enumerated for those location contexts.

Values of estimated heights described herein are illustrative and are not the only possible heights. Although meters have been predominantly used to illustrate possible heights above a surface, any measurement units of height may be used.

In some embodiments, a predefined range of heights (e.g., 1.5 to 2.25 meters) can be used instead of a singular height (e.g., 2.0 meters), which may be useful to account for an unknown height of the user or other things (e.g., car seats, pockets in bags, locations of bags on things, etc.). When a range of predefined heights is used, a predefined height (e.g., 1.5 meters or 2.25 meters) within the outer height limits of the range (e.g., 1.5 to 2.25 meters) can be used as the estimated height if that predefined height matches a difference between an initial estimated altitude of the mobile device and a known altitude of the surface, or either of the outer height limits of the range are used as the estimated height if the predefined height of that outer height limit is closer to the difference, which assumes that the closer a predefined height is to the difference the more accurate that predefined height is compared to other predefined heights. This assumption reduces the chance of too much calibration that could occur if the other outer height limit were used. The same approach can be used when a range is not used, but two or more possible predefined heights are used, where selection from among the possible predefined heights involves selecting the closest of the predefined heights to the difference.

In some uses of the processes described herein, the height of a mobile device could be determined to a fine degree (e.g., within 1 foot, 1 inch or another distance of actual height), which could be useful for directing a user to a specific item at a specific height (e.g., on a shelf, where the mobile device could direct the user to "look down one shelf to find the low sodium chicken noodle soup.") Of course, such fine degree of accuracy need not always be achieved during each use of each process described herein, and looser degrees of accuracy are tolerated (e.g., within 0.5-1.0 meters of actual height) for other uses discussed in relation to step 260 of FIG. 2A and step 295 of FIG. 2B.

Different possible heights above a surface (e.g., ground or floor) at which a mobile device may be located have been described herein. In some embodiments, the height of a thing on or in which a mobile phone is expected to reside is known (e.g., a height of a counter, desk, table, pants pocket, handlebars of a bike, console of a car, etc.), and can be used as a possible estimated height. Such known heights can be surveyed over time or retrieved from a data source. In some embodiments, heights of things can be adjusted based on heights of other things (e.g., a height of pants pockets can be adjusted by a height of shoes a user is wearing (e.g., flats, boots, heels, etc.).

Calibration

Different approaches exist for estimating an altitude of a mobile device (e.g., the mobile device 120 of FIG. 1). In a barometric-based positioning system, altitude can be computed using a measurement of pressure from a pressure sensor of a mobile device along with ambient pressure measurement(s) from a network of calibrated reference pressure sensors and a measurement of ambient temperature from the network or other source. An estimate of an altitude of a mobile device (altitude$_{mobile}$) can be computed by the mobile device, a server, or another machine that receives needed information as follows:

$$altitude_{mobile} = altitude_{sensor} - \frac{RT}{gM}\ln\left(\frac{P_{sensor}}{P_{mobile}}\right), \quad \text{(Equation 2)}$$

where P$_{mobile}$ is an estimate of pressure that needs to be accurate to within a tolerated amount of pressure from true pressure (e.g., less than 5 Pa) at the location of the mobile device as measured by a pressure sensor of the mobile device, P$_{sensor}$ is an estimate of pressure at the location of a reference pressure sensor, T is an estimate of temperature (e.g., in Kelvin) at the location of the reference pressure sensor or a different location of a remote temperature sensor, altitude$_{sensor}$ is an estimated altitude of the reference pressure sensor that is estimated to within a desired amount of altitude error (e.g., less than 1.0 meters), g corresponds to the acceleration due to gravity, R is a gas constant, and M is molar mass of air (e.g., dry air or other). The minus sign (−) may be substituted with a plus sign (+) in alternative embodiments of Equation 2, as would be understood by one of ordinary skill in the art. The estimate of pressure at the location of the reference pressure sensor can be converted to an estimated reference-level pressure that corresponds to the reference pressure sensor in that it specifies an estimate of pressure at the latitude and longitude of the reference pressure sensor, but at a reference-level altitude that likely differs from the altitude of the reference pressure sensor. The reference-level pressure can be determined as follows:

$$P_{ref} = P_{sensor} \times \exp\left(-\frac{gM\left(\begin{array}{c}altitude_{ref} - \\ altitude_{sensor}\end{array}\right)}{RT}\right), \quad \text{(Equation 3)}$$

where P$_{sensor}$ is the estimate of pressure at the location of the reference pressure sensor, P$_{ref}$ is the reference-level pressure estimate, and h$_{ref}$ is the reference-level altitude. The altitude of the mobile device altitude$_{mobile}$ can be computed using Equation 3, where altitude$_{ref}$ is substituted for altitude$_{sensor}$ and P$_{ref}$ is substituted for P$_{sensor}$ as follows:

$$altitude_{mobile} = altitude_{ref} - \frac{RT}{gM}\ln\left(\frac{P_{ref}}{P_{mobile}}\right). \quad \text{(Equation 4)}$$

The reference-level altitude altitude$_{ref}$ may be any altitude and is often set at mean sea-level (MSL). When two or more reference-level pressure estimates are available, the reference-level pressure estimates are combined into a single reference-level pressure estimate value (e.g., using an average, weighted average, or other suitable combination of the reference pressures), and the single reference-level pressure estimate value is used for the reference-level pressure estimate P$_{ref}$.

The pressure sensor of the mobile device is typically inexpensive and susceptible to drift over time. Consequently, the pressure sensor of the mobile device must be frequently calibrated to ensure measurements of pressure at the altitude of the mobile device have accuracy needed for accurate estimates of the mobile device's altitude. One approach for calibrating a pressure sensor of a mobile device determines a calibration adjustment (C) that, when applied to a measurement of pressure by the pressure sensor (P$_{mobile}$), results in an estimated altitude (altitude$_{mobile}$) that is within a tolerated amount of distance from the true altitude at which a mobile device resides (altitude$_{truth}$). One such approach uses the following formula to solve for the calibration adjustment (C):

$$altitude_{truth} = h_{ref} - \frac{RT}{gM}\ln\left(\frac{P_{ref}}{P_{mobile}+C}\right). \quad \text{(Equation 5)}$$

The true altitude at which a mobile device resides (altitude$_{truth}$) can be replaced by a combination of a known altitude of a surface (altitude$_{surface}$) and the estimated height above the surface at which the mobile device is located (h$_{estimated}$) as follows:

$$altitude_{truth} = altitude_{surface} + h_{estimated} \quad \text{(Equation 6)},$$

which results in:

$$altitude_{surface} + h_{estimated} = h_{ref} - \frac{RT}{gM}\ln\left(\frac{P_{ref}}{P_{mobile}+C}\right) \quad \text{(Equation 7)}$$

Alternatively, the left and right sides of Equation 7 need not be equal, and instead need only be within a tolerated amount of altitude from each other, such as 0.0 to 0.5 meters.

The known altitude of the surface (altitude$_{surface}$) can be determined in different ways. For example, an identifier of the surface can be determined, and the identifier can be used to look up the altitude of the surface from a floor or terrain database. Identifier determination can be accomplished in different ways—e.g., user input identifying the surface, detection of communication between the mobile device and a device (e.g., a point-of-sale system, a thermostat, a Wi-Fi beacon) that resides in an area associated with the surface, an initial estimated position of the mobile device that is within an area of the surface, or other methods.

Alternatively, pressure can be differentiated with respect to height and used to help determine the calibration value (C) as described below. For example, $$P_{at\,altitude_1} = P_{at\,altitude_2}\exp\left(\frac{gM\left(\begin{array}{c}altitude_2 - \\ altitude_1\end{array}\right)}{RT}\right) \quad \text{(Equation 8)}$$

can be used to derive the following formula $$\frac{dP}{dh} = \frac{gMP}{RT} \approx 0.034\frac{P}{T}, \quad \text{(Equation 9)}$$

where P represents the mobile pressure in this specific context as it shows how a small height discrepancy of the mobile device can translate into a calibration value for the pressure sensor of the mobile device. Thus, the calibration value (C) can be determined as shown below:

$$C = (altitude_{truth} - altitude_{mobile}) \times \frac{dP}{dh}, \quad \text{(Equation 10)}$$

where $$altitude_{truth} = altitude_{surface} + h_{estimated} \quad \text{(Equation 11)}.$$

Technical Benefits

Mobile devices are used to estimate altitudes of their users in different environments or to estimate altitudes of surfaces (e.g., floors in a building or outdoor ground surfaces) at which the mobile devices reside. When estimated altitudes are based on (i) reference pressures from a network of reference pressure sensors and (n) measurements of pressure from pressure sensors of the mobile devices, limitations in the functionality of pressure sensors in mobile devices such as sensor drift over time can impact the accuracy of estimated mobile device altitudes by up to several meters, or can prevent accuracy to within a threshold amount of altitude (e.g., 1.0 meters or less). Regular calibration of pressure sensors in mobile devices is a requirement for accurate altitude estimates. Past approaches for calibrating a pressure sensor relative to a known altitude of a surface make assumptions for the unknown height at which the mobile device is located above the surface, but these assumptions can introduce error into the calibration result where the true height of the mobile device above the surface differs from the assumed height by more than a threshold amount of height (0.5 or 1.0 meters). When estimated altitudes of mobile devices are determined using altitudes of surfaces over which mobile devices are located, uncertainty as to heights of the mobile devices above the surfaces introduced by lack of technology for determining those heights can impact the accuracy of estimated mobile device altitudes by up to several meters or can prevent accuracy to within a threshold amount of altitude (e.g., 1.0 meters or less). Processes described herein overcome the above technical limitations and generate new and useful data—e.g., improved estimated heights above surfaces that are more accurate and more reliable compared to assumed heights or unknown heights. The improved estimated heights produced by the processes described herein enable (i) improved calibration results, (ii) improved estimated positions that enable quicker emergency response times or otherwise improve the usefulness of estimated positions, and (iii) improved estimated altitudes of surfaces.

Other Aspects

Any method (also referred to as a "process" or an "approach") described or otherwise enabled by disclosure herein may be implemented by hardware components (e.g., machines), software modules (e.g., stored in machine-readable media), or a combination thereof. In particular, any method described or otherwise enabled by disclosure herein may be implemented by any concrete and tangible system described herein. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media (e.g. one or more non-volatile or volatile storage media, removable or non-removable media, integrated circuit media, magnetic storage media, optical storage media, or any other storage media, including RAM, ROM, and EEPROM) that may be patented under the laws of the jurisdiction in which this application is filed, but does not include machine-readable media that cannot be patented under the laws of the jurisdiction in which this application is filed. Systems that include one or more machines and one or more non-transitory machine-readable media for implementing any method described herein are also contemplated herein. One or more machines that perform or implement, or are configured, operable or adapted to perform or implement operations comprising the steps of any methods described herein are also contemplated herein. Each method described herein that is not prior art represents a specific set of rules in a process flow that provides significant advantages in the field of determining one or more heights of one or more mobile devices above surfaces. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement—e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component).

FIG. 4 illustrates components of a transmitter, a mobile device, and a server. Examples of communication pathways are shown by arrows between components.

By way of example in FIG. 4, each of the transmitters may include: a mobile device interface 11 for exchanging information with a mobile device (e.g., an antenna and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, other) at or near the transmitter; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter; (ii) generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

By way of example FIG. 4, the server may include: a mobile device interface 21 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

Certain aspects disclosed herein relate to estimating the positions of mobile devices—e.g., where the position is represented in terms of: latitude, longitude, and/or altitude coordinates; x, y, and/or z coordinates; angular coordinates; or other representations. Various techniques to estimate the position of a mobile device can be used, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon are known, then the difference between those times multiplied by speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Pat. Pub. No. 2012/0182180, published Jul. 19, 2012. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

This application relates to the following related application(s): U.S. patent application Ser. No. 16/721,184, filed Dec. 19, 2019, entitled SYSTEMS AND METHODS FOR DETERMINING A HEIGHT OF A MOBILE DEVICE ABOVE A SURFACE; and U.S. Pat. Appl. No. 62/791,849, filed Jan. 13, 2019, entitled SYSTEMS AND METHODS FOR DETERMINING A HEIGHT OF A MOBILE DEVICE ABOVE A SURFACE. The content of each of the related application(s) is hereby incorporated by reference herein in its entirety.

What is claimed is:

1. A method comprising:
    retrieving first data that comprises at least one measurement value determined by at least one sensor of a mobile device;
    determining a location context based on the first data;
    retrieving second data that is of a type that is associated with the determined location context;
    determining, based on the retrieved second data, an estimated height at which the mobile device is located above a surface; and
    calibrating a pressure sensor of the mobile device based on the estimated height at which the mobile device is located above the surface, estimating an altitude of the mobile device as a sum of an altitude of the surface and the estimated height at which the mobile device is located above the surface, or determining an estimated altitude of the surface as a difference between an estimated altitude of the mobile device and the estimated height at which the mobile device is located above the surface;
    wherein determining the location context comprises:
    determining that the location context specifies the mobile device as being with a user who is on foot when the at least one measurement value is indicative of a movement associated with a walking or running user;
    determining that the location context specifies the mobile device as being on or with a user who is on a bike when the at least one measurement value is indicative of a movement associated with a moving bike;
    determining that the location context specifies the mobile device as being in a vehicle when the at least one measurement value is indicative of a movement associated with a moving vehicle;

determining that the location context specifies the mobile device as being stationary when the at least one measurement value is indicative of no movement; or determining that the location context specifies the mobile device as being on a surface after being dropped when the at least one measurement value is indicative of resting after falling.

2. The method of claim 1, wherein:

the at least one measurement value is indicative of a movement associated with a walking or running user when (i) the at least one measurement value represents a stepping movement of the user recorded over time, or (ii) the at least one measurement value includes periodic measurements of an angular orientation from a gyroscope that is indicative of an orientation at which a mobile device is periodically positioned while being carried by a user who is walking or running.

3. The method of claim 1, wherein:

the at least one measurement value is indicative of movement associated with a moving bike when (i) a measured spread of up and down Z-accelerations exceeds a threshold value for a percent of time during which Z-accelerations are measured, or (ii) a measured spread of increases and decreases of XY-accelerations exceeds a threshold value for a percent of time during which XY-accelerations are measured.

4. The method of claim 1, wherein:

the at least one measurement value is indicative of a movement associated with a moving vehicle when (i) a measured spread of up and down Z-accelerations exceeds a threshold value for a percent of time during which Z-accelerations are measured, or (ii) a measured spread of increases and decreases of XY-accelerations exceeds a threshold value for a percent of time during which XY-accelerations are measured.

5. The method of claim 1, wherein:

the at least one measurement value is indicative of no movement when (i) a difference between two readings of an accelerometer that are measured within a predefined amount of time of each other is below an acceleration threshold, or (ii) an angular separation between two orientation readings of a gyroscope that are measured within another predefined amount of time of each other is below an orientation threshold.

6. The method of claim 1, wherein:

the at least one measurement value is indicative of resting after falling when (i) an accelerometer of the mobile device measures a large impact via a sudden change in Z-axis acceleration from one measurement to another measurement that exceeds a threshold amount of change, or (ii) the accelerometer of the mobile device measures no Z-axis acceleration after a measurement of Z-axis acceleration associated with falling.

7. The method of claim 1, wherein:

the at least one measurement value is indicative of a movement associated with a moving vehicle when the at least one measurement value is indicative of turbulent conditions quantified as (i) a variance or standard deviation of the at least one measurement value over a time period that exceeds a threshold, or (ii) a range of the at least one measurement value over the time period that exceeds a threshold.

8. A system comprising one or more machines configured to perform the method of claim 1.

9. One or more non-transitory processor-readable media embodying program instructions that, when executed by one or more machines, cause the one or more machines to implement the method of claim 1.

10. A method comprising:

retrieving first data that comprises at least one estimated position of a mobile device;

determining a location context based on the first data;

retrieving second data that is of a type that is associated with the determined location context;

determining, based on the retrieved second data, an estimated height at which the mobile device is located above a surface; and calibrating a pressure sensor of the mobile device based on the estimated height at which the mobile device is located above the surface, estimating an altitude of the mobile device as a sum of an altitude of the surface and the estimated height at which the mobile device is located above the surface, or determining an estimated altitude of the surface as a difference between an estimated altitude of the mobile device and the estimated height at which the mobile device is located above the surface;

wherein:

the first data includes two or more estimated positions of the mobile device; and determining the location context comprises:

determining that the location context specifies the mobile device as being with a user who is on foot when the two or more estimated positions are indicative of a movement associated with a walking or running user;

determining that the location context specifies the mobile device as being on or with a user who is on a bike when the two or more estimated positions are indicative of a movement associated with a bike;

determining that the location context specifies the mobile device as being in a vehicle when the two or more estimated positions are indicative of a movement associated with a vehicle;

determining that the location context specifies the mobile device as being stationary when the two or more estimated positions are indicative of a movement associated with being stationary; or determining that the location context specifies the mobile device as being on a surface after being dropped when the two or more estimated positions are indicative of a movement associated with falling to and landing on the surface.

11. The method of claim 10, wherein:

the two or more estimated positions are indicative of a movement associated with a walking or running user when a velocity of the mobile device calculated by dividing a distance between two of the two or more estimated positions by a time elapsed between when each of the estimated positions was determined is above a threshold associated with a minimum walking speed and below a threshold associated with a maximum running speed.

12. The method of claim 10, wherein:

the two or more estimated positions are indicative of a movement associated with a bike when a velocity of the mobile device calculated by dividing a distance between two of the two or more estimated positions by a time elapsed between when each of the estimated positions was determined is above a threshold associated with a maximum running speed and below a threshold associated with a maximum bike speed or associated with a speed below which a vehicle is unlikely to be traveling.

13. The method of claim 10, wherein:
the two or more estimated positions are indicative of a movement associated with a vehicle when a velocity of the mobile device calculated by dividing a distance between two of the two or more estimated positions by a time elapsed between when each of the estimated positions was determined is i) above a threshold associated with a maximum bike speed or associated with a speed below which a vehicle is unlikely to be traveling, and ii) below a threshold associated with a maximum speed of a vehicle.

14. The method of claim 10, wherein:
the two or more estimated positions are indicative of a movement associated with being stationary when a velocity of the mobile device calculated by dividing a distance between two of the two or more estimated positions by a time elapsed between when each of the estimated positions was determined is below a threshold associated with a minimum walking speed.

15. The method of claim 10, wherein:
the two or more estimated positions are indicative of a movement associated with being stationary when a velocity of the mobile device calculated by dividing a distance between two of the two or more estimated positions by a time elapsed between when each of the estimated positions was determined is below a threshold associated with a minimum walking speed and when a vertical velocity of the mobile device is below a vertical velocity threshold.

16. The method of claim 10, wherein:
the two or more estimated positions of the mobile device include a first estimated position and a second estimated position; and
the two or more estimated positions are indicative of a movement associated with falling to and landing on the surface when the second estimated position is lower than the first estimated position, and a vertical velocity of the mobile device calculated by dividing a Z distance between the two estimated positions by a time elapsed between when each of the estimated positions was determined is above a vertical velocity threshold.

17. The method of claim 10, wherein:
the two or more estimated positions of the mobile device include a first estimated position and a second estimated position; and
the two or more estimated positions are indicative of a movement associated with falling to and landing on the surface when the second estimated position is lower than the first estimated position, a vertical velocity of the mobile device calculated by dividing a Z distance between the two estimated positions by a time elapsed between when each of the estimated positions was determined is above a vertical velocity threshold, and a horizontal velocity of the mobile device calculated by dividing an XY distance between the first and second estimated positions by the time elapsed between when each of the estimated positions was determined is below a threshold associated with a minimum walking speed.

18. A method comprising:
retrieving first data that comprises at least one estimated position of a mobile device;
determining a location context based on the first data;
retrieving second data that is of a type that is associated with the determined location context;
determining, based on the retrieved second data, an estimated height at which the mobile device is located above a surface; and
calibrating a pressure sensor of the mobile device based on the estimated height at which the mobile device is located above the surface, estimating an altitude of the mobile device as a sum of an altitude of the surface and the estimated height at which the mobile device is located above the surface, or determining an estimated altitude of the surface as a difference between an estimated altitude of the mobile device and the estimated height at which the mobile device is located above the surface;
and wherein:
the first data includes an estimated position of the mobile device; and
determining the location context comprises determining that the location context specifies the mobile device as being (i) with a user who is on foot if the estimated position is on or within a threshold distance to a venue where the user is likely to be walking or running with the mobile device, (ii) on or with a user who is on a bike if the estimated position is on or within a threshold distance to a bike path where the user is likely to be riding a bike with the mobile device, (iii) in a vehicle if the estimated position is on or within a threshold distance to a highway or expressway, or (iv) stationary if the estimated position is at the user's residence or workplace.

* * * * *